US008280413B2

(12) United States Patent
Choi et al.

(10) Patent No.: US 8,280,413 B2
(45) Date of Patent: Oct. 2, 2012

(54) MOBILE TERMINAL AND WORLD TIME DISPLAY METHOD THEREOF

(75) Inventors: Mee-Yeon Choi, Seoul (KR); Jee-Yong Chun, Seoul (KR)

(73) Assignee: LG Electronics Inc., Seoul (KR)

( * ) Notice: Subject to any disclaimer, the term of this patent is extended or adjusted under 35 U.S.C. 154(b) by 673 days.

(21) Appl. No.: 12/026,442

(22) Filed: Feb. 5, 2008

(65) Prior Publication Data

US 2008/0188210 A1 Aug. 7, 2008

(30) Foreign Application Priority Data

Feb. 6, 2007 (KR) .................. 10-2007-0012330
Apr. 4, 2007 (KR) .................. 10-2007-0033412

(51) Int. Cl.
*H04M 4/00* (2006.01)
*H04M 1/00* (2006.01)

(52) U.S. Cl. ..................... 455/457; 455/550.1
(58) Field of Classification Search .................. 455/457, 455/456.1–456.3, 414.3, 566, 556.2, 564, 455/565; 345/715, 1.1, 2.3, 3.1, 156–162, 345/168–173, 179–180; 368/20–23, 30
See application file for complete search history.

(56) References Cited

U.S. PATENT DOCUMENTS 4,681,460 A * 7/1987 Nishimura ................ 368/21
2003/0013494 A1* 1/2003 Imura ..................... 455/566
2005/0262278 A1* 11/2005 Schmidt ................... 710/62
2008/0045173 A1* 2/2008 Park et al. ............... 455/187.1

FOREIGN PATENT DOCUMENTS

| CN | 1738322 A | | 2/2006 |
|---|---|---|---|
| EP | 1 659 817 A2 | | 5/2006 |
| GB | 2327779 A | * | 2/1999 |
| GB | 2 389 017 A | | 11/2003 |
| KR | 2000-0027959 A | | 5/2000 |
| KR | 2004-0073149 A | | 8/2004 |
| KR | 2005-0017527 A | | 2/2005 |
| KR | 2006-0003687 A | | 1/2006 |
| KR | 10-2008-0016946 A | | 2/2006 |

* cited by examiner

*Primary Examiner* — Melody Mehrpour
*Assistant Examiner* — Emem Stephen
(74) *Attorney, Agent, or Firm* — Birch, Stewart, Kolasch & Birch, LLP

(57) ABSTRACT

A mobile terminal and its world time display method are disclosed. The mobile terminal executes a world time display function according to the occurrence of an event. A particular area is selectively received according to the executed world time display function, and time information and representative information of the selected area are obtained and displayed. The time information includes date, a time zone, and information about a time difference between an area where a terminal is currently located and the selected area. The representative information includes a building that represents the selected area, popular tourist attractions, animals and plants, a country code, an area code, traditional costumes, etc. Simple information with respect to the particular area as well as the time information of the particular area can be provided to the user.

23 Claims, 17 Drawing Sheets

US 8,280,413 B2

MOBILE TERMINAL AND WORLD TIME DISPLAY METHOD THEREOF

BACKGROUND

A mobile terminal for displaying time information and representative information of a particular area and its world time display method are provided.

Mobile terminals may be configured to perform various functions including, for example, a data and voice communication function, a function of capturing images or videos via a camera, a voice data storage function, a music file reproducing (play) function via a speaker system, an image or video display function, and the like. Some mobile terminals may have an additional function of executing (playing) games, while others may be implemented as multimedia devices. In addition, recently, mobile terminals may receive broadcast or multicast signals to allow users to watch video or television programs.

Efforts are being made to support or increase such diverse functions of the mobile terminals, including changes and modifications in software or hardware as well as in structural elements constituting the mobile terminals.

As globalization continues, cooperation between people in different countries is increasing and mobile terminal users who travel frequently or do business in many countries need to verify the time of different countries for various business or personal purposes. As such, mobile terminals typically support a world time display function.

However, the related art mobile terminal having such world time display function provides only limited information such as the date and time of a particular area (city), which may be insufficient to mobile terminal users. In addition, such related art mobile terminals fail to meet the demand of the users who desire sophisticated visual effects that provide a more-user friendly graphical interface.

SUMMARY

The present inventors recognized certain drawbacks of the related art, as explained above. Upon such recognition, the following concepts and features have been conceived.

A mobile terminal for displaying time information and representative information of a particular area and its world time display method are provided herein.

Also, a mobile terminal that allows the user to conveniently and easily recognize a world time and its world time display method are provided herein.

Additionally, a mobile terminal for performing a different function based on information about a particular area being displayed and its world time display method are provided herein.

A mobile terminal for displaying history of a selected area and its world time display method are also provided herein.

DETAILED DESCRIPTION

A mobile terminal according to exemplary embodiments of the present invention will now be described in detail with reference to the accompanying drawings.

Figure 1:
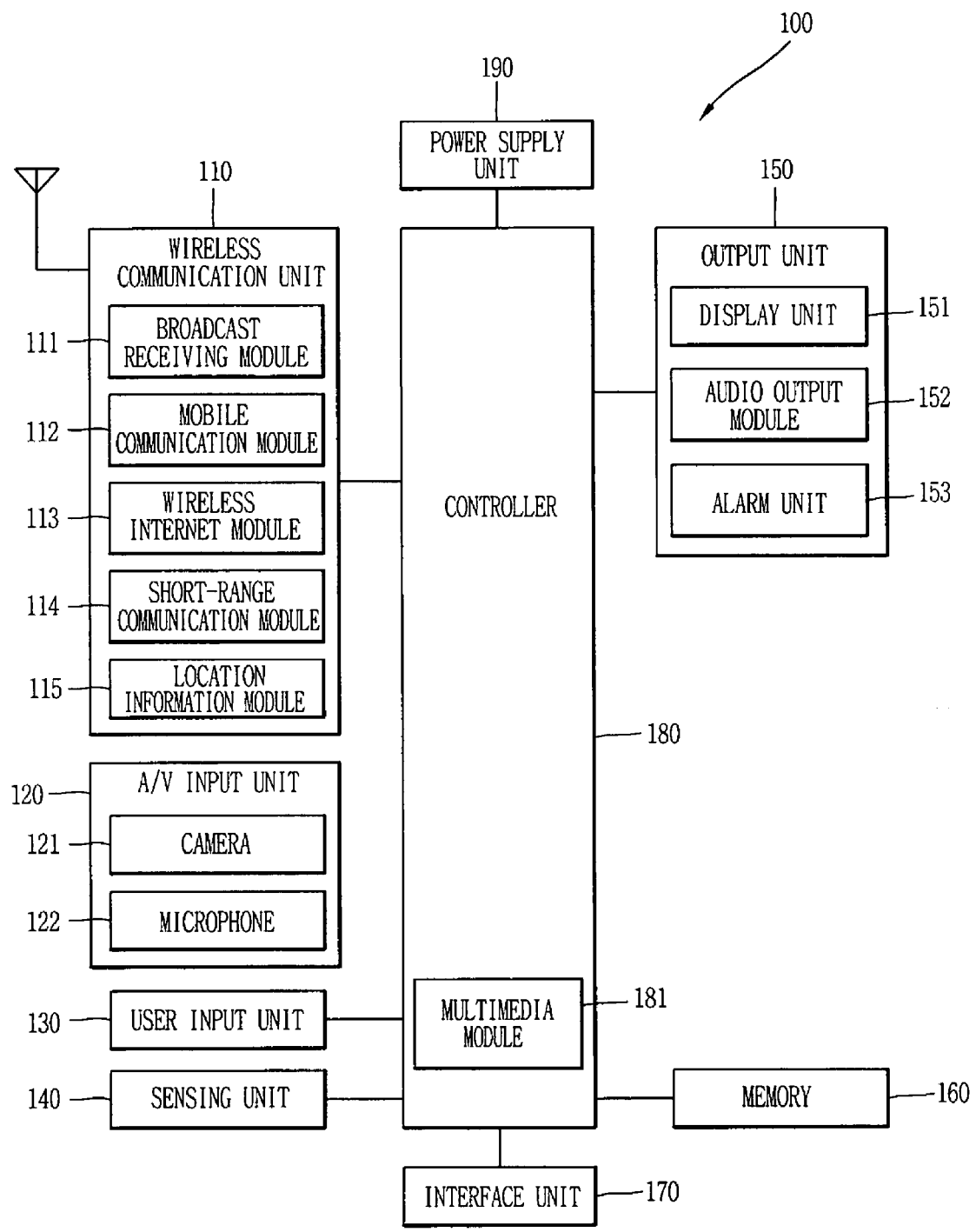
FIG. 1 is a block diagram of a mobile terminal according to an embodiment of the present invention.

FIG. 1 is a schematic block diagram of a mobile terminal according to an embodiment of the present invention.

The mobile terminals may be implemented in various forms. For example, the mobile terminal may include mobile phones, smart phones, notebook computers, digital broadcasting terminals, PDAs (Personal Digital Assistants), PMPs (Portable Multimedia Players), navigators, and the like.

With reference to FIG. 1, the mobile terminal 100 includes a wireless communication unit 110, an A/V input unit 120, a user input unit 130, a sensing unit 140, an output unit 150, a memory 160, an interface unit 170, a controller 180, a power supply unit 190, and the like. The mobile terminal 100 shown in FIG. 1 includes various elements, which, however, may not be all the essential elements. The mobile terminal may be implemented by including more elements than those as shown in FIG. 1 or less elements than those as shown.

The elements of the mobile terminal 100 will now be described.

The wireless communication unit 110 may include one or more elements allowing the mobile terminal 100 and a wireless communication system to wirelessly communicate with each other or the mobile terminal 100 and a network in which the mobile terminal 100 is located to wirelessly communicate with each other. For example, the wireless communication unit 110 may include a broadcast receiving module 111, a mobile communication module 112, a wireless Internet module 113, a short-range communication module 114, a location information module 115, or the like.

The broadcast receiving module 111 receives a broadcast signal and/or broadcast associated information from an external broadcast management server through a broadcast channel. The broadcast channel may include a satellite channel and a terrestrial channel. The broadcast management server may refer to a server that generates and transmits a broadcast signal and/or broadcast associated information or a server that receives previously generated broadcast signal and/or broadcast associated information and transmits it to a terminal. The broadcast associated information may refer to information related to a broadcast channel, a broadcast program, a broadcast service provider, etc. The broadcast signal may include not only a TV broadcast signal, a radio broadcast signal, a data broadcast signal but also a broadcast signal obtained by combining a data broadcast signal to a TV broadcast signal or to a radio broadcast signal.

The broadcast associated information may be provided via a mobile communication network, and in this case, it may be received by the mobile communication module 112.

The broadcast associated information may be implemented in various formats. For example, the broadcast associated information may include an EPG (Electronic Program Guide) of DMB (Digital Multimedia Broadcasting) or an ESG (Electronic Service Guide) of a DVB-H (Digital Video Broadcast-Handheld), and the like.

The broadcast receiving module 111 receives broadcast signals by using various broadcast systems, and particularly, it receives a digital broadcast signal by using a digital broadcast system such as a DMB-T (Digital Multimedia Broadcasting-Terrestrial), a DMB-S (Digital Multimedia Broadcasting-Satellite, Media FLO™ (Media Forward Link Only), the DVB-H, ISDB-T (Integrated Services Digital Broadcast-Terrestrial), etc. As a matter of course, the broadcast receiving module 111 may be configured to be suitable for any other broadcast systems that provide a broadcast signal as well as the digital broadcast system.

The broadcast signal and/or broadcast associated information received through the broadcast receiving module 111 may be stored in the memory 160.

The mobile communication module 112 transmits and receives a radio signal to and from at least one of a base station, an external terminal and a server in a mobile communication network. Here, the radio signal may include a voice call signal, a video call signal, or various formats of data according to transmission and reception of text/multimedia messages.

The wireless Internet module 113 refers to a module for a wireless Internet connection, and may be installed in the mobile terminal or may be positioned as an external element.

The short-range communication module 114 refers to a module for short-range communications. Suitable technologies for implementing this module may include Bluetooth, RFID (Radio Frequency Identification), IrDA (Infrared Data Association), UWB (Ultra Wideband), ZigBee, etc.

The location information module 115 is a module for checking or acquiring location information of the mobile terminal. For example, the location information module 115 may be embodied by using a GPS (Global Positioning System) module that receives location information from a plurality of artificial satellites. Here, the location information may include coordinate information represented by the latitude and longitude. For example, the GPS module may measure an accurate time and distance from three or more satellites and accurate calculate a current location of the mobile terminal according to trigonometry based on the three different distances. A method of acquiring distance and time information from three satellites and correcting an error with a single satellite may be used. In particular, the GPS module may acquire an accurate time together with three-dimensional speed information as well as the location of the latitude, longitude and altitude from the location information received from the satellites.

The A/V input unit 120 is configured to input an audio signal or a video signal and may include a camera 121 and a microphone 122, etc. The camera 121 processes an image frame such as a still image or video obtained by an image sensor in a video call mode or in an image capturing mode. The processed image frame may be displayed on the display unit 151.

The image frame processed by the camera 121 may be stored in the memory 160 or transmitted to the exterior via the wireless communication unit 110. Two or more cameras 121 may be provided according to the configuration of the terminal.

The microphone 122 receives an external audio signal in a calling mode, recording mode or voice recognition mode, etc., and processes it into electrical voice data. In case of the calling mode, the processed voice data may be converted for output into a format that can be transmittable to a mobile communication base station via the mobile communication module 112. The microphone 122 may include assorted noise canceling algorithms to cancel noise generated in the course of receiving the external audio signal.

The user input unit 130 generates input data inputted by the user to control the operation of the terminal. The user input unit 130 may be formed as a keypad, a dome switch, a touch pad (e.g., static pressure/capacitance), a jog wheel, a jog switch, and the like. In particular, when the touch pad is overlaid on the display unit 151 in a layered manner, it may be called a touch screen.

The sensing unit 140 senses a current state of the mobile terminal 100 such as an opened or closed state of the mobile terminal 100, a location of the mobile terminal 100, or whether the mobile terminal 100 is being touched or not by the user, the direction of the mobile terminal 100, acceleration/deceleration of the mobile terminal 100, or the like, and generates a sense signal for controlling the operation of the mobile terminal. For example, when the mobile terminal is a slide phone, the sensing unit 140 may sense whether the slide phone is opened or closed. In addition, the sensing unit 140 handles a sensing function as to whether or not the power supply unit 190 supplies power or whether or not the interface unit 170 is combined with an external device.

The interface unit 170 serves as an interface with every external device connected with the mobile terminal 100. For example, the external devices may include a wired/wireless headset port, an external charger port, a wired/wireless data port, a memory card port, a port for connecting a device having an identification module, an audio I/O (Input/Output) port, a video I/O port, an earphone port, and the like.

Here, the identification module may be a chip that stores various information for authentication the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may be fabricated in the form of smart card. Accordingly, the identifying device may be connected with the terminal 100 via a port. The interface unit 170 may receive data from the external device or provided with power and transfer the received data or power to each element of the mobile terminal 100 or transmits internal data of the mobile terminal 100 to the external device.

The output unit 150 is configured to output an audio or video signal or an alarm signal, and may include a display unit 151, a audio output module 152, and an alarm unit 153.

The display unit 151 outputs information processed in the mobile terminal 100. For example, when the mobile terminal is in a calling mode, the display unit 151 displays UI (User Interface) or a GUI (Graphic User Interface) related to a call. When the mobile terminal 100 is in a video calling mode or an image capturing mode, the display unit 151 displays a captured or/and received image or UI and GUI.

As stated above, when the display unit 151 and the touch pad are formed into a touch screen in a layered manner, the display unit 151 may be also used as an input unit as well as as the output unit. The display unit 151 may include at least one of a liquid crystal display (LCD), a thin film transistor LCD, an organic light emitting diode, a flexible display, and a three-dimensional (3D) display. The mobile terminal 100 may include two or more of such displays according to an embodiment. For example, the mobile terminal 100 may include both an external display (not shown) and an internal display (not shown).

The audio output module 152 outputs audio data which has been received from the wireless communication unit 110 in a call signal reception mode, a calling mode, a recording mode, a voice recognition mode, a broadcast reception mode, etc., or outputs audio data which has been stored in the memory 160. In addition, the audio output module 152 outputs an audio signal related to a function (e.g., a call signal reception sound, a message reception sound, etc.) performed in the mobile terminal 100. The audio output module 152 may include a speaker, a buzzer, and the like.

The alarm unit 153 outputs a signal informing about occurrence of an event of the mobile terminal 100. The event occurring in the mobile terminal may be, for example, a call signal reception, a message reception, a key signal input, or the like. The alarm unit 153 outputs a signal informing about occurrence of an event in a different format other than an audio signal or a video signal. For example, the alarm unit 153 may output a signal in the form of vibration. When a call signal or a message is received, the alarm unit 153 may output vibration in order to inform about the received call signal or message. Or, when a key signal is inputted, the alarm unit 153 may output vibration as a feedback of the inputted key signal. Through the output of the vibration, the user can recognize the occurrence of an event. As a matter of course, the signal for informing about the occurrence of an event may be outputted also through the display unit 151 or the audio output module 152.

The memory 160 may store a program for processing and controlling performed by the controller 180, and may perform a function for temporarily storing inputted or outputted data (e.g., a phone book, a message, a still image, or video, etc.).

The memory 160 may include a storage medium of at least one of a flash memory type, a hard disk type, a multimedia card micro type, a card type memory (e.g., an SD or XD memory, etc.), a RAM (Random Access Memory), an SRAM (Static Random Access Memory), a ROM (Read Only Memory), an EEPROM (Electrically Erasable Programmable Read-Only Memory), a PROM (programmable Read-Only Memory), a magnetic memory, a magnetic disk, and an optical disk. In addition, the mobile terminal 100 may operate a Web storage that performs a storage function of the memory 160 on the Internet.

The controller 180 typically controls the general operation of the mobile terminal. For example, the controller 180 performs controlling and processing related to a voice call, data communication, or a video call. In addition, the controller may include a multimedia module 181 for reproducing multimedia. The multimedia module 181 may be formed within the controller 180 or may be formed separately from the controller 180.

The power supply unit 190 receives external or internal power and supplies power required for an operation of each element under the control of the controller 180.

Various embodiments described herein may be implemented within a computer-readable recording medium by using software, hardware or their combinations.

According to hardware implementation, the embodiments described herein may be implemented by using at least one of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, microcontrollers, and an electrical unit for performing a function. In some cases, such embodiments may be implemented by the controller 180.

According to software implementation, embodiments such as a procedure or a function may be implemented in conjunction with a separate software module that performs at least one function or operation. A software code may be implemented by a software application written in a proper program language. In addition, the software code may be stored in the memory 160 and executed by the controller 180.

In the above description, the mobile terminal according to the present invention has been explained in terms of elements from the perspective of their functions of the mobile terminal. Hereinafter, the mobile terminal according to the present invention will be explained in terms of the external elements with reference to FIGS. 2 and 3. For the brevity of description, the slide type mobile terminal, among various types of mobile terminals such as a folder type, a bar type, a swing type, a slider type, etc., will be taken as an example. The present invention is not limited to the slide type mobile terminal but can be applicable to any type of mobile terminals including the above-mentioned ones.

Figure 2:
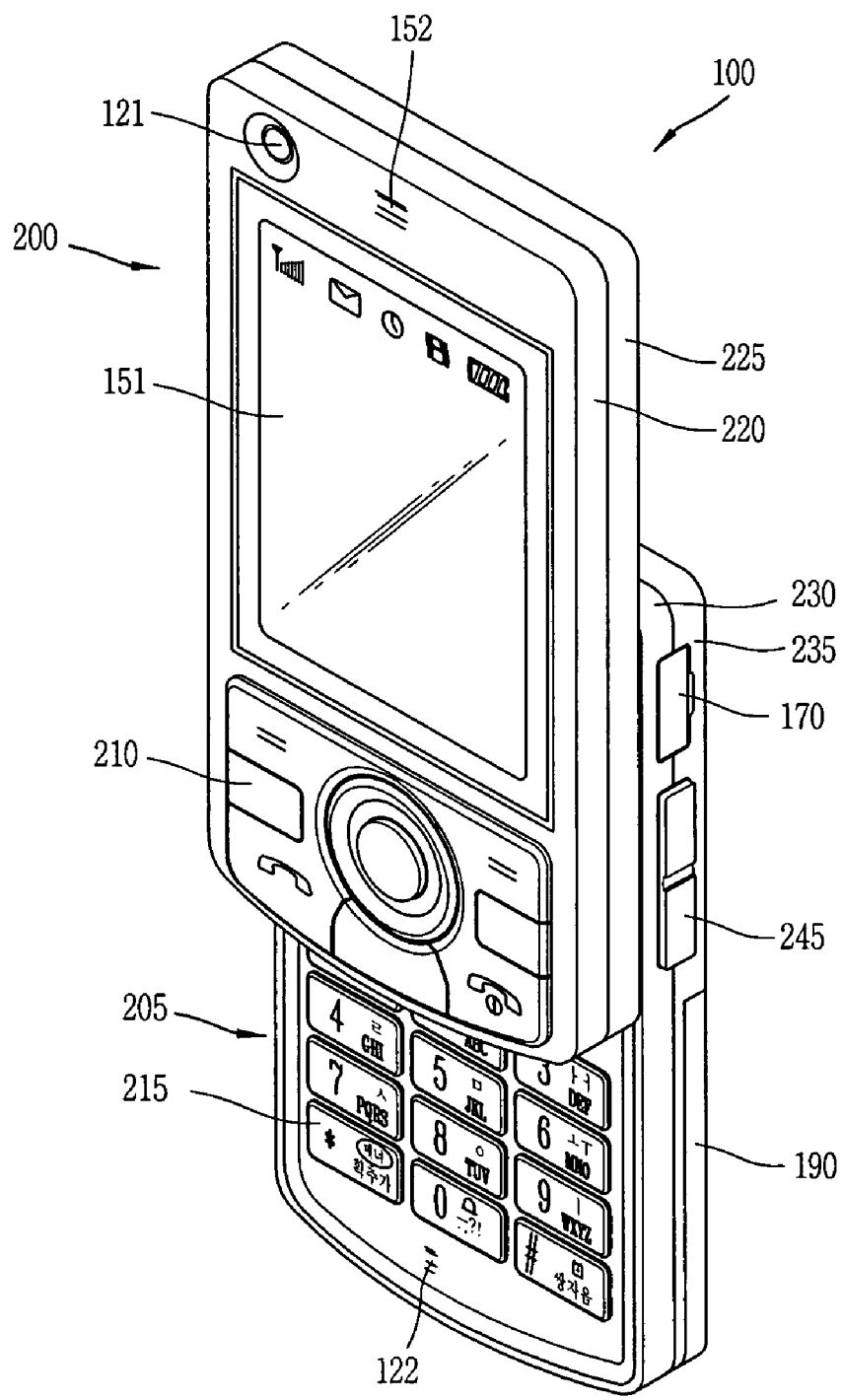
FIG. 2 is a front perspective view of the mobile terminal according to the embodiment of the present invention.

FIG. 2 is a front perspective view of the mobile terminal according to one exemplary embodiment of the present invention.

The mobile terminal according to the present invention includes a first body 200 and a second body 205 formed to be slidably moved along at least one direction on the first body 200.

A state in which the first body is disposed to overlap with the second body 205 may be called a closed configuration, and as shown in FIG. 2, a state in which the first body 200 exposes at least a portion of the second body 250 may be called an open configuration.

In the closed configuration, the mobile terminal mainly operates in a standby mode (idle mode), and the standby mode may be released according to a user manipulation. The mobile terminal operates mainly in the calling mode or the like in the open configuration, and it can be changed to the standby mode with the lapse of a certain time or a user manipulation.

The case (a casing, a housing, a cover, etc.) constituting the external appearance of the first body 200 is formed by a first front case 220 and a first rear case 225. Various electronic components are installed in a space between the first front case 220 and the first rear case 225. One or more intermediate cases may be additionally disposed between the first front case 220 and the first rear case 225.

The cases may be formed by injection-molding a synthetic resin or may be made of a metallic material such as stainless steel (STS) or titanium (Ti), etc.

On the first body 200, substantially on the first front case 220, the display unit 151, the first audio output module 152, the camera 121 or a first user input unit 210 may be disposed.

The display unit 151 includes an LCD (Liquid Crystal Display) or an OLED (Organic Light Emitting Diode), etc., that visually displays information.

A touch pad (or similar element) may be overlaid (overlapped, superimposed, covered) on the display unit 151 in a layered manner to allow the display unit 151 to operate as a touch screen, whereby the user may input information (or commands) by touching the display unit 151.

The first audio output module 152 may be implemented in the form of a speaker.

The camera 121 may be implemented to be suitable for capturing an image or video of the user, and so on.

Like the first body 200, the case constituting the external appearance of the second body 205 is formed by a second front case 230 and a second rear case 235.

A second user input unit 215 may be disposed on the second body, specifically, on a front face of the second front case 230.

A third user input unit 245, a microphone 122, and an interface unit 170 may be disposed on at least one of the second front case 230 or the second rear case 235.

The first to third user input units 210, 215 and 245 may be called the user input unit 130, and any means can be employed as the first to third user input units 210, 215 and 245 so long as it can be operated in a tactile manner.

For example, the user input unit may be implemented as a dome switch or a touch pad that can receive a command or information according to a pressing or a touch operation by the user, or may be implemented as a wheel or jog type for rotating a key or as a joystick.

In terms of function, the first user input unit 210 is a function key for inputting a command such as start, end or scroll, etc., and the second user input unit 216 is a keypad for inputting a number, a character or a symbol.

The third user input unit 245 may be operated as a hot key for activating a special function within the mobile terminal.

The microphone 122 may be implemented in a proper form suitable for receiving a voice of the user or other sounds, etc.

The interface unit 170 may be used as a passage (path or link) allowing the mobile terminal to exchange data with an external device through a fixed line or wirelessly. For example, the interface unit 170 may be at least one of a connection port to be connected with the earphone, a port for short range communication (e.g., an IrDA port, a Bluetooth port or a wireless LAN port, etc.), and a power supply port for supplying power to the mobile terminal.

The interface unit 170 may be a card socket for receiving (accommodating) an external card such as a SIM (Subscriber Identification Module), a UIM (User Identity Module) or a memory card for storing information, etc.

The power supply unit 190 may be mounted at the side of the second rear case 235 in order to supply power to the mobile terminal.

The power supply unit 190 may be, for example, a chargeable battery which can be detachably combined for being charged.

Figure 3:
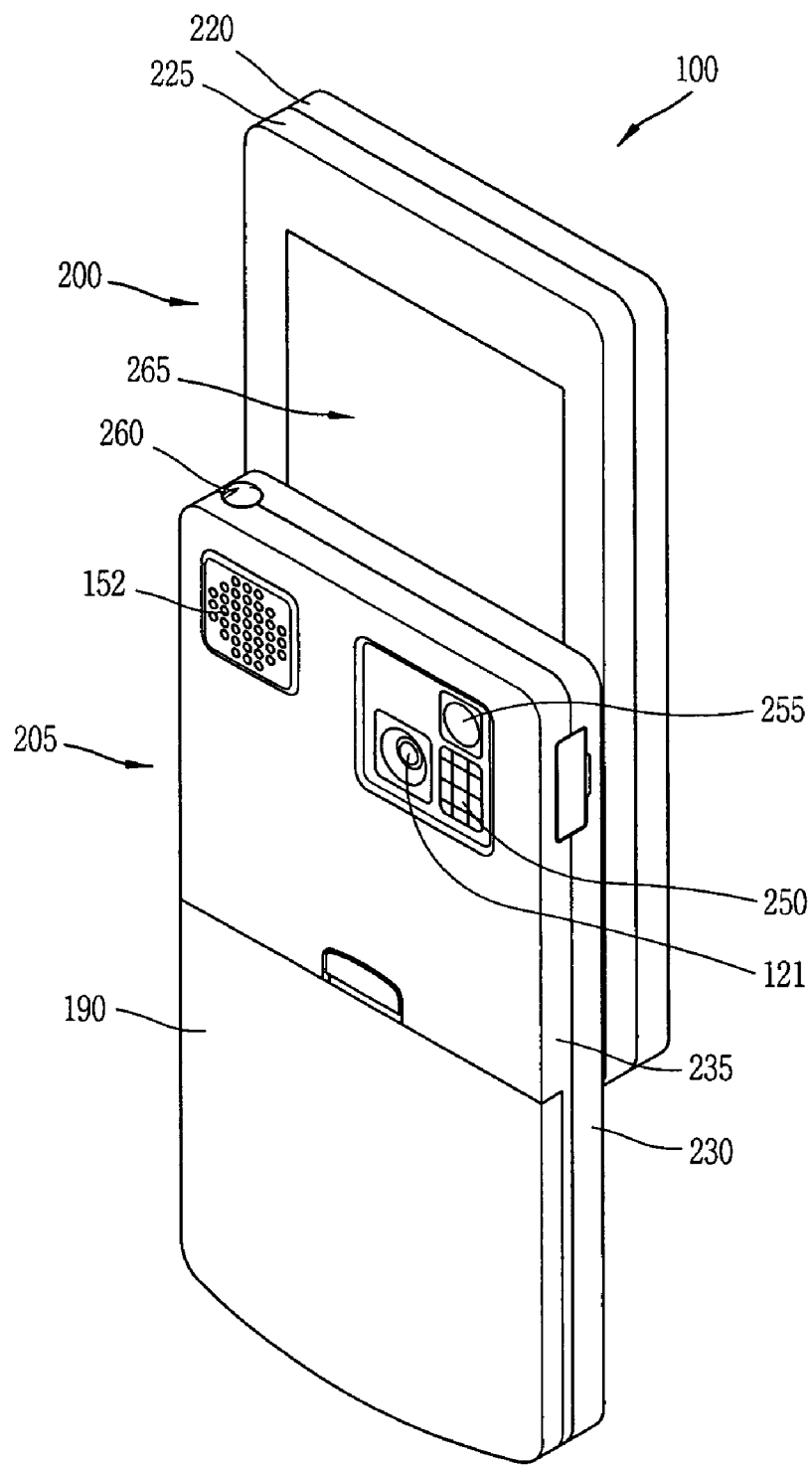
FIG. 3 is a rear perspective view of the mobile terminal according to the embodiment of the present invention.

FIG. 3 is a rear perspective view of the mobile terminal according to one exemplary embodiment of the present invention.

With reference to FIG. 3, a camera 121 may be additionally mounted on the rear surface of the second rear case 235 of the second body 205. The camera 121 of the second body 205 may have an image capture direction which is substantially the opposite to that of the camera 121 of the first body 200, and may have a different number of pixels (different resolution) as that of the camera 121 of the first body 200.

For example, the camera 121 may be used for low resolution (i.e., supporting a relatively small number of pixels) to quickly capture an image (or video) of the user's face and immediately transmit the same to the other party during video conferencing or the like. Meanwhile, the camera 121 of the second body 205 may be used for high resolution (i.e., supporting a relatively large number of pixels) in order to capture more detailed (higher quality) images (or video) which typically do not need to be transmitted immediately.

A flash 250 and a mirror 255 may be disposed to be adjacent to the camera 121 of the second body 205. When an image of the subject is captured with the camera 121 of the second body 205, the flash 250 illuminates the subject. The mirror 255 allows the user to see himself when he wants to capture his own image (self-image capturing) by using the camera 121 of the second body 205.

The audio output module 152 may be additionally disposed on the second rear case 235.

The audio output module 152 may implement a stereophonic function in conjunction with the audio output module 152 of the first body 200, and may be also used for a call in a speaker phone mode.

A broadcast signal reception antenna 260 may be disposed at one side of the second rear case 235, in addition to an antenna used for call communication. The antenna 260 may be installed such that it can be extended from the second body 205.

One part of the slide module 265 that slidably combines the first body 200 and the second body 205 may be disposed on the first rear case 225 of the first body 200.

The other part of the slide module 265 may be disposed on the second front case 230 of the second body 205, which may not be exposed as shown in FIG. 3.

In the above description, the camera 121 and so on is disposed on the second body 205, but the present invention may not be limited to the configuration.

For example, one or more of the elements 260 and 121 or 150 and 152 which are disposed on the second rear case 235 in the above description, may be mounted on the first body 200, mainly, on the first rear case 225. In this case, those elements disposed on the first rear case 225 can be protected by the second body 205 in the closed configuration. In addition, even if the camera 121 of the second body 205 is not provided, the camera 121 of the first body 200 may be configured to rotate (or otherwise be moved) to thus allow image capturing in various directions.

The terminal 100 as illustrated in FIGS. 1 to 3 may be configured to be operable in a communication system that may transmit data via a frame or a packet, including a wired/wireless communication system or a satellite-based communication system.

The communication system in which the mobile terminal according to the present invention can be operable will now be described with reference to FIG. 4.

The communication system may use different air interfaces and/or physical layers. For example, air interfaces that can be used by the communication system may include a frequency division multiple access (FDMA), a time division multiple access (TDMA), a code division multiple access (CDMA), a universal mobile telecommunications system (UMTS) (in particular, long term evolution (LTE)), global system for mobile communications (GSM), and the like. For the sake of explanation, the CDMA will be described. However, the present invention can be applicable to every communication system including a CDMA wireless communication system.

Figure 4:
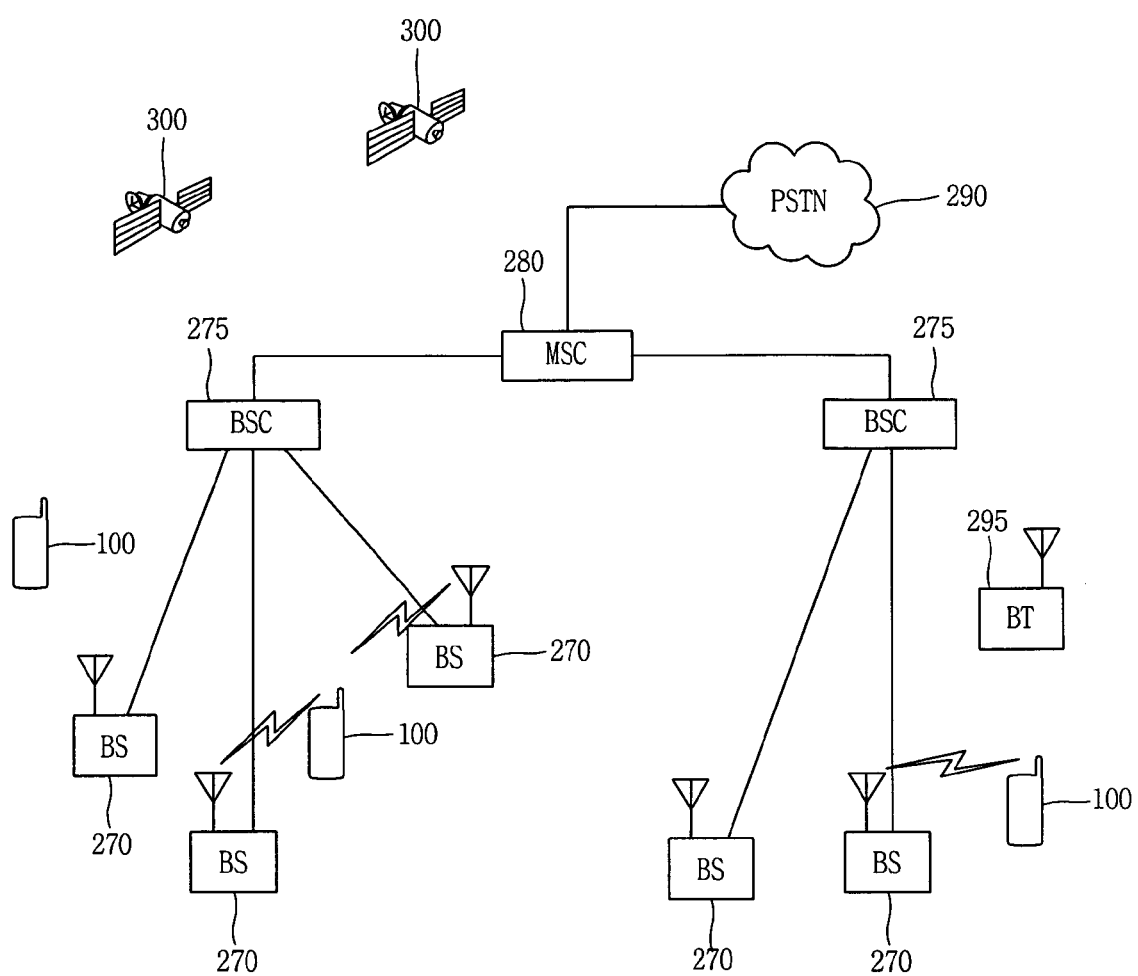
FIG. 4 is a block diagram showing a wireless communication system in which a mobile terminal is operable according to the embodiment of the present invention.

As shown in FIG. 4, the CDMA wireless communication system may include multiple terminals 100, multiple base stations (BSs) 270, multiple base station controllers (BSCs) 275, and a mobile switching center (MSC) 280. The MSC 280 is connected to a public switched telephone network (PSTN) 290 and also to the BSCs 275. The BSCs 275 may be connected by paring with the BSs 270 via a backhaul line. The backhaul line may be provided according to at least one of E1/T1, ATM, IP, PPP, Frame Relay, HDSL, ADSL, and xDSL. Accordingly, the multiple BSCs 274 may be included in the system as shown in FIG. 4.

Each BS 270 may include at least one sector and each sector may include an omni-directional antenna or an antenna pointing a particular radial orientation from the BSs 270. Each sector may include two or more various types of antennas. Each BS 270 may be configured to support allocation of multiple frequencies and each allocation of multiple frequencies may have a particular spectrum (e.g., 1.25MHz, 5MHz, etc.).

Intersection of a sector and frequency allocation may be called a CDMA channel. The BSs 270 may be called base station transceiver subsystem (BTSs). In this case, the base station may be called to include a single BSC 275 and at least one BS 270. In addition, the base station may indicate a cell site. The respective sectors with respect to a particular BS 270 may be called multiple cell sites.

As shown in FIG. 4, a broadcasting transmitter (BT) 295 may transmit a broadcast signal to the terminals 100 operating in the system. The broadcasting module 111 shown in FIG. 1 is provided in the terminal 100 to receive the broadcast signal transmitted by the BT 295.

Several GPS satellites 300 are shown in FIG. 4. The satellites 300 may help recognize the location of at least one of the terminals 100. Although FIG. 4 shows two satellites, usable location information may be acquired by two or less or two or more satellites. The GPS module 115 as shown in FIG. 1 may cooperate with the satellites 300 to acquire desired location information. Here, any techniques for tracking the location other than the GPS tracking technique may be used to track the location. In addition, at least one of the GPS satellites 300 may selectively or additionally handle satellite DMB transmission.

As typical operations of the wireless communication system, the BS 270 receives uplink signals from the various terminals 100. In this case, the terminals 100 may be connecting a call, transmitting or receiving a message, or performing a different communication operation. Each uplink signal received by a particular BS 270 is processed in the particular BS 270. Data generated according to the processing result may be transmitted to the connected BSC 275. The BSC 275 provides functions such as call resource allocation and mobility management, including a function such as systemizing soft handoff between BSs 270. In addition, the BSC 275 transmits the received data to the MSC 280, and the MSC 280 provides an additional transmission service for a connection with the PSTN 290. In a similar manner, the PSTN 290 is connected with the MSC 280, the MSC 280 is connected with the BSCs 275, and the BSCs 275 control the BSs 270 to transmit downlink signals to the terminals 100.

Figure 5:
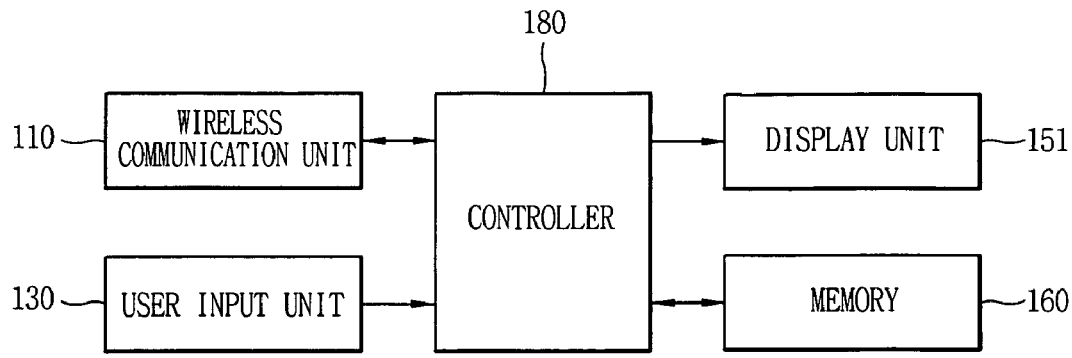
FIG. 5 is a schematic block diagram showing a mobile terminal according to an embodiment of the present invention.

FIG. 5 is a schematic block diagram showing a mobile terminal according to an embodiment of the present invention.

With reference to FIG. 5, the mobile terminal 100 includes the wireless communication unit 110, the user input unit 130, the display unit 151, the memory unit 160, and the controller 180.

The wireless communication unit 110 performs radio communication and includes at least one of the broadcast receiving module 111, the mobile communication module 112, the wireless internet module 113, the short-range communication module 114, and the location information module 115. In the present invention, the wireless communication unit 110 may serve to receive time information and representative information for a particular area.

The user input unit 130 generates input data to control an operation of the terminal according to user manipulation as described above. The user input unit 130 may be implemented as a touch screen by being combined with the display unit 151 (to be described).

The display unit 151 may display a status and results according to an operation of the mobile terminal 100. The display unit 151 may include one or more display regions. In general, the display unit 151 may include one or more display regions. In general, the screen of the display unit 151 may include a status display region 151a that displays terminal status information such as the signal strength, a statue of alarm setting, a status of message reception, a remaining battery capacity, or the like, and an information display region 151b that displays results according to the operation of the terminal. In the present invention, the information display region 151b may be divided into multiple display regions. The screen image configuration of the display unit 151 will be described in detail later.

The memory unit 160 stores the representative information of the particular area and information associated with time information. The representative information may include the name of a city, a country code, a city code, a national flag, a building, animals and plants, the traditional costumes, popular tourist attractions, geographical locations, climates, country languages, etc. The representative information may be arbitrarily added or deleted by the user. In addition, the information associated with the time information may include a time zone indicating day and night, dates, time difference information between a current location and a selected area, etc.

The memory unit 160 may stores various programs for controlling the operation of the mobile terminal 100 and a program for providing a world time display function.

When a particular event occurs, the controller 180 may execute the world time display function, and controls the display unit 151 to display time information and representative information of a particular area (e.g., a country or a city) according to the operation of the executed world time display function.

The particular event may occur when a command for executing the world time display function is inputted through manipulation of a menu by the user or when an external key such as a function key or a hot key to which a corresponding function for quickly executing the world time display function is inputted. The particular event may be also generated by an internal operation of the mobile terminal 100 such as automatic roaming, alarm, etc.

When the user attempts making a call with a world time displayed on the terminal, the controller 180 controls such that a country code and an area code of the currently displayed area can be automatically inputted to allow the user to perform call communication by simply inputting only a phone number of another party.

In addition, the controller 180 searches origination/termination history identical to the country code and/or area code of the currently displayed area and displays the same. Accordingly, the user can select a person (desired party) for communication through the displayed history and perform call communication. For example, if the currently displayed area is Washington, the controller would search records (origination/reception records) of calls which have been made to Washington and displays the same.

Figure 6:
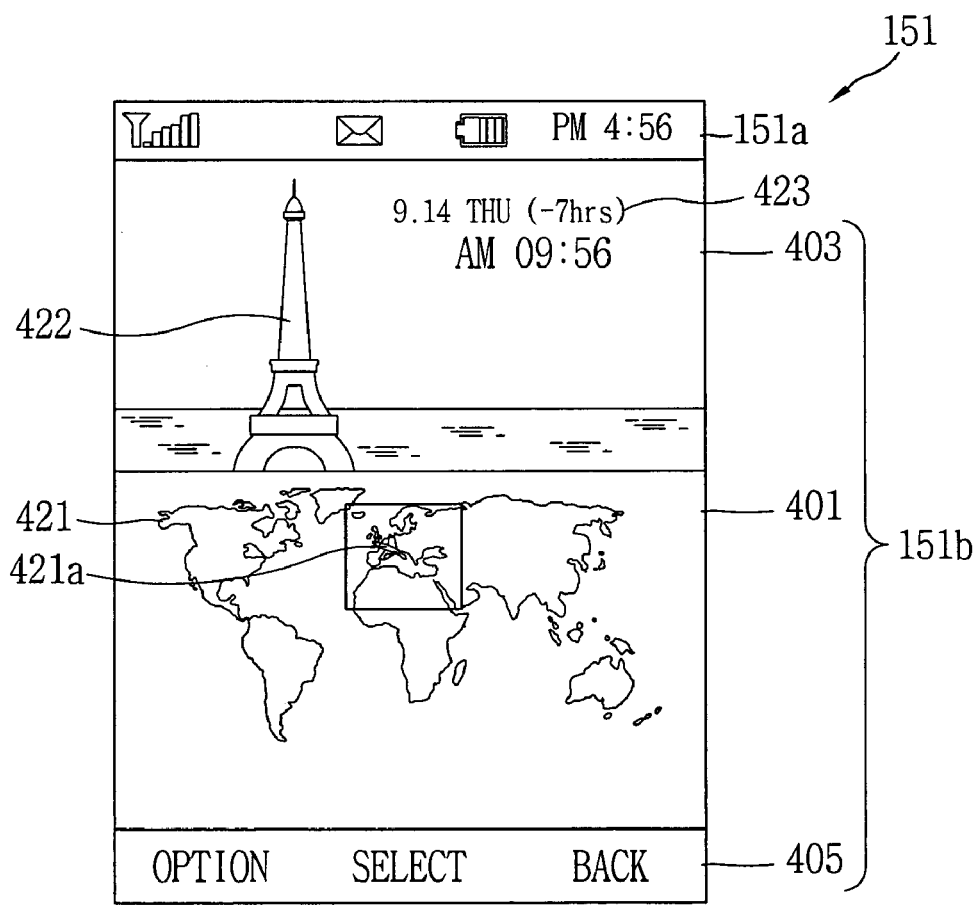
FIG. 6 is a view showing one example of a screen image of the mobile terminal according to the embodiment of the present invention.

FIG. 6 is a view showing one example of a screen image of the display unit of the mobile terminal according to an embodiment of the present invention.

The display unit 151 of the mobile terminal 100 includes the status display region 151a that displays terminal status information and the information display region 151b that displays information generated according to an operation of the terminal.

As shown in FIG. 6, the information display region 151b may include a first display region 401 for allowing the user to select a particular area and a second display region 403 for displaying time information of the selected area. The first display region 401 may provide a map image 421 allowing the user to conveniently select the particular area.

A cursor 421a may be displayed on the map image 421 to allow the user to conveniently check a location of the selected particular area. The cursor 421a may have a shape of a flying object as shown in FIG. 6 to provide a movement status between areas with the reality, and although not shown, the cursor 421a may have a shape of cross-hairs, coordinate indicator or a flag to allow the location of the selected particular area to be more easily recognized.

Meanwhile, the movement of the cursor 421 may be performed via the user input 130 of the mobile terminal 100. For example, the location of the cursor 421a that appears on the map image 421 may be moved according to the manipulation of a direction key of the user input unit 130, through which the particular area desired by the user can be selected. Here, the selection of the particular area may be performed by simply moving the cursor 421a, or after the cursor 421a is moved, information about the particular area on which the cursor 421a is positioned may be executed to be outputted.

In a different example for moving the position of the cursor 421a, at least the first display region 401 may be configured as a touch screen and a desired point on the map image 421 may be touched. Then, the position of the cursor 421a may be moved to the touched position or the cursor 421a may be moved according to a dragging operation of the user.

When the particular area is selected from the first display region 401, time information 423 of the selected area may be displayed on the second display region 403. The time information 423 of the selected area may further provide information about the weather or may further provide time difference information between an area where the mobile terminal 100 is currently located and the selected area.

A typical image or geographically representative image allowing the user to easily recognize the selected area may be also provided on the second display region 403 together with the time information 423. The representative image may include buildings, architecture, tourist attractions, etc. that represent the selected area as shown in FIG. 6, and may also include animals, plants, traditional costumes, cultural items etc., that may symbolize the corresponding area. Meanwhile, besides the image that represents the particular area as stored in the memory 160, an image may be added or modified by the user as the image representing the particular area. For example, if the terminal 100 has an image capture function (such as a camera), an image that may be captured in selecting the particular area may be linked to be displayed on the second display region 403 as a typical image of the particular image.

The display unit 151 may be configured to adjust the brightness of a background image according to the time information of the particular area provided on the second display region 403. For example, if it is daytime at the selected area, the background image is displayed to be brighter, and if it is nighttime at the selected area, the background image is displayed to be darker. Accordingly, the user can easily, accurately and quickly recognize the current time of the selected area.

The display unit 151 may additionally display a background image indicating weather conditions of the particular area provided on the second display region 403. In this case, for example, information about weather conditions of the selected area may be received via the wireless communication unit 110. If the weather of the particular area according to the received weather condition information is clear and sunny, the controller 180 may display a background image indicating clear, sunny weather. If the weather is rainy, snowy or windy, the controller 180 may control such that a corresponding background image indicating such weather condition is displayed.

Additionally, the display unit 151 may further include a third display region 405 indicating menus or other graphical indications (icons) corresponding to keys provided via the user input unit 130.

Meanwhile, the mobile terminal may be set to add or delete information about the selected area. Namely, the mobile terminal 100 may be implemented such that time information and representative information of the selected area may be added and/or deleted.

Figure 7:
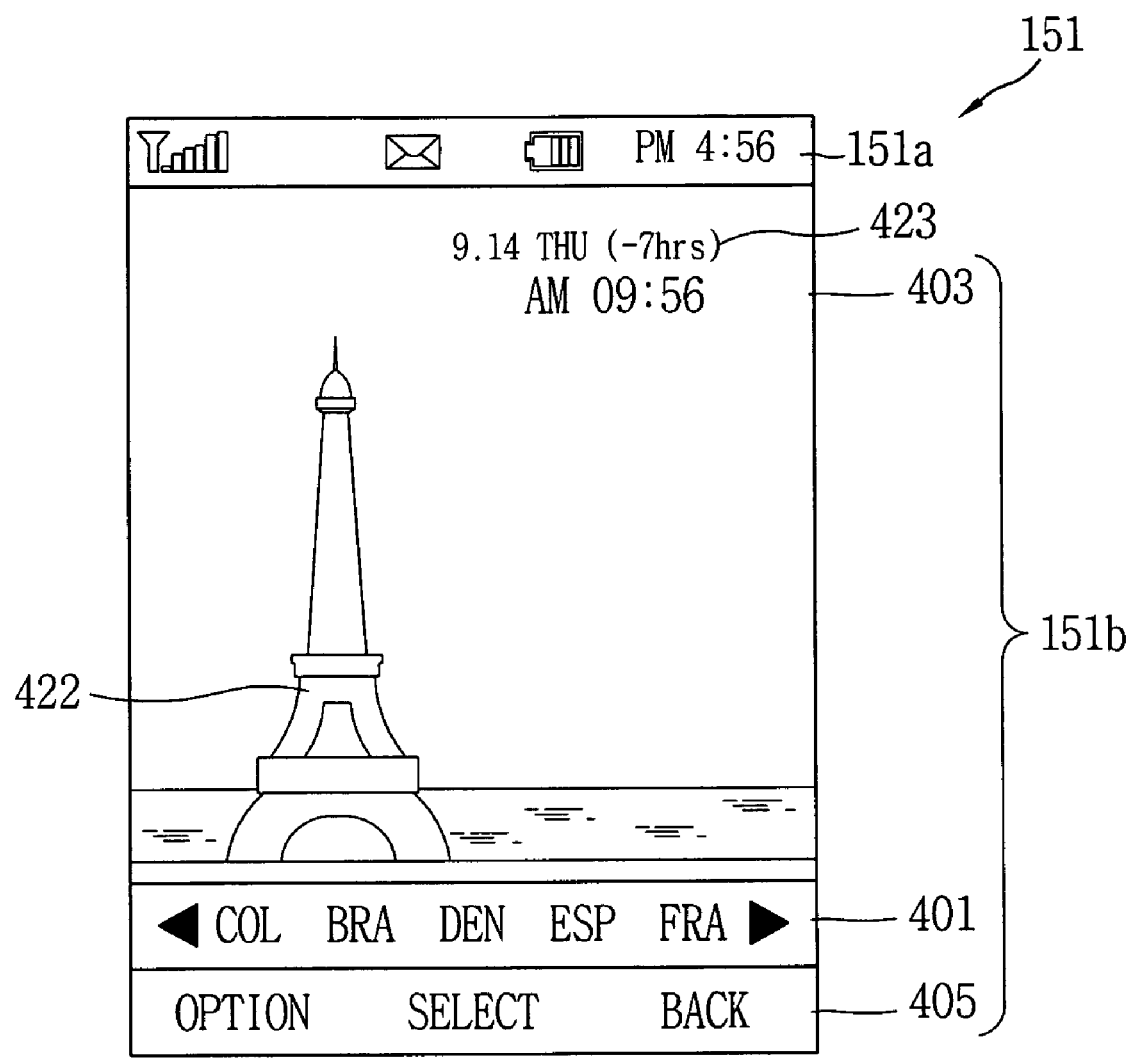
FIG. 7 is a view showing another example of a screen image of the mobile terminal according to the embodiment of the present invention.

FIG. 7 is a view showing another example of a screen configuration of the mobile terminal according to an embodiment of the present invention. In the present invention, the basic configuration of this example of the screen configuration of the mobile terminal is similar to that as shown in FIG. 6. Accordingly, such configuration will now be described briefly.

As shown in FIG. 7, as mentioned above, the display unit 151 may be configured to allow user selection of a particular area and provide time information and representative information of the selected area.

The screen image of the display unit 151 may be divided into a first display region 401 and a second display region 403 in the same manner as described above. Here, the first display region 401 may provide a list of area names to allow the user to select a particular area. For example, a list of city names such as Paris, Hanover, LA, Washington, D.C., Bangkok, Vancouver, etc. Such listing of area names may help the user who may not be accurately aware of the location of the particular area desired to be selected.

In this case, the area names on the list provided at the first display region 401 may be arranged alphabetically or other location order of the areas. In addition, the list of areas may be configured such that a particular area can be selected as a cursor (not shown) is moved over the arranged area names of the list.

A particular area may be selected via the user input unit 130 of the mobile terminal 100. For example, a direction key (or other manipulation means) of the user input unit 130 may be manipulated to move the cursor on the list of the area names provided at the first display region 401 to select the corresponding area. Meanwhile, the location of the cursor may be fixed while the list of area names may move relative to the fixed cursor to select a desired particular area.

The particular area may be selected as the cursor is positioned over the name of the particular area or after the cursor is positioned on the name of the particular area, information about the corresponding area may be then outputted.

In a modification of the embodiment as shown in FIG. 7, a desired area name (or an acronym) may be directly inputted to the first display region 401 to select a corresponding area that matches the inputted area name. This is advantageous for users who may not be accurately aware of the actual geographical location of the particular area desired to be selected.

Figure 8:
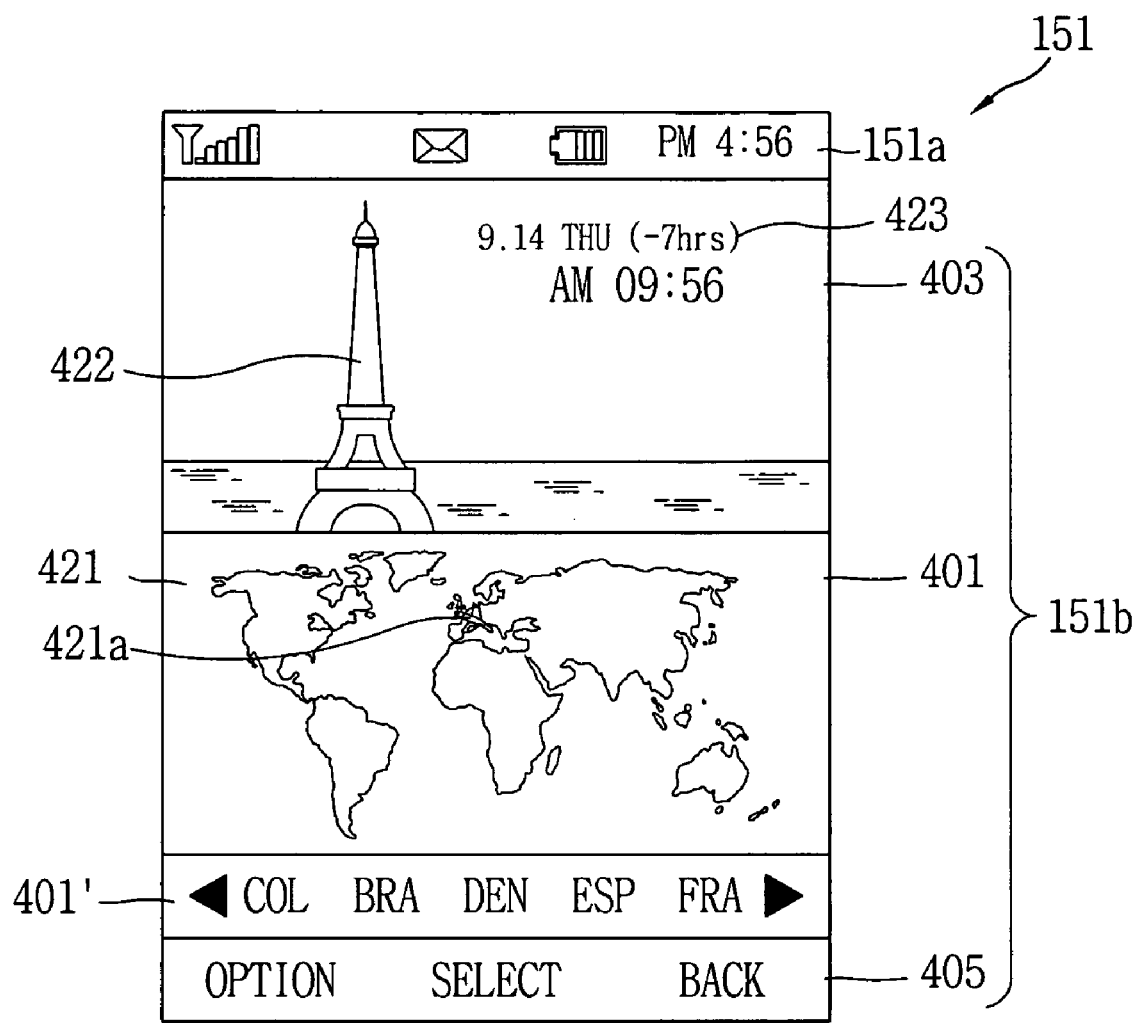
FIG. 8 is a view showing another example of a screen image of the mobile terminal according to the embodiment of the present invention.

FIG. 8 is a view showing another example of a screen configuration of the mobile terminal according to an embodiment of the present invention.

The information display region 151b may include the first display region 401 providing the map image 421 and a third display region 401' providing a list of particular areas allowing the user to select a desired particular area. Namely, the providing the list of the particular areas is based on the configuration of the example as shown in FIG. 7, and the first display region 401 providing the map image 421 is based on the configuration of the example as shown in FIG. 6.

Accordingly, the configuration of the map image 421 provided at the first display region 401 is the same as that of the first example, so its description will be omitted. In addition, the configuration of the list of area names provided at the third display region 401' may be the same as that of the second example, so its description will be omitted.

The first display region 401 and the third display region 401' may operated in association as follows. First, a particular area of the list of area names provided at the third display region 401' may be selected.

In this case, the list of area names provided at the first display region 401 may be arranged alphabetically or by some other location order, or the cursor (not shown) may be moved over the arranged list to select the particular area.

Meanwhile, the position of the cursor may be fixed while the list of the area names may move relative thereto to select the particular area. In addition, the selecting of the particular area may be executed such that after the cursor is positioned on the arranged area names, then the information about the corresponding area is outputted.

When the particular area is selected from the list of the area names provided at the third display region 401', the cursor 421a on the image 421 provided at the first display region 401 may move to the position corresponding to the area selected at the third display region 401' to indicate the position of the selected area. In this case, the user may select multiple areas.

Meanwhile, when the cursor 421a positioned on the map image 421 provided at the first display area 401 is moved, an area name corresponding to the cursor 421 a location may be designated at the third display region 401'.

Figure 9:
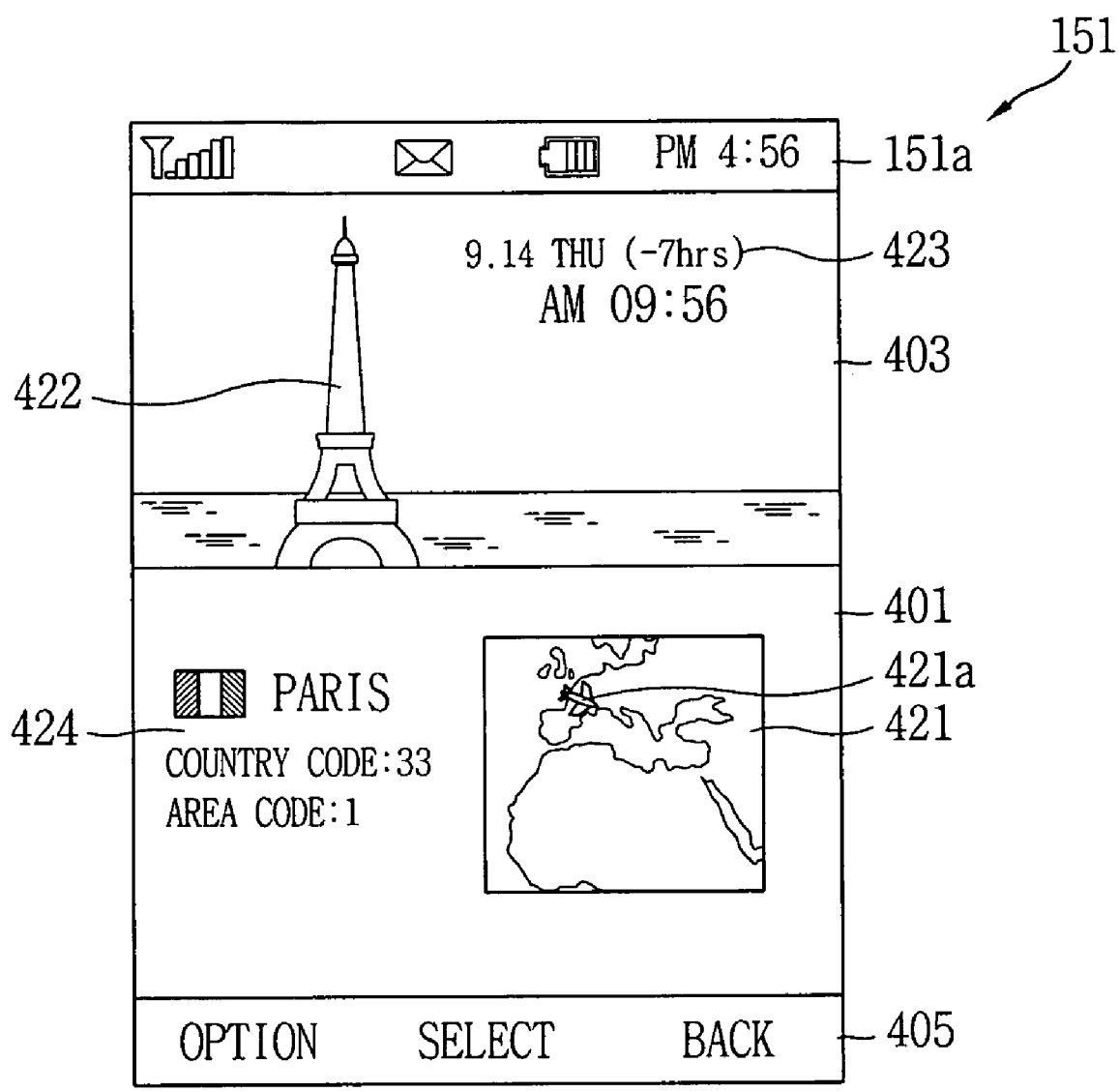
FIG. 9 is a view showing another example of a screen image of the mobile terminal according to the embodiment of the present invention.
Figure 10:
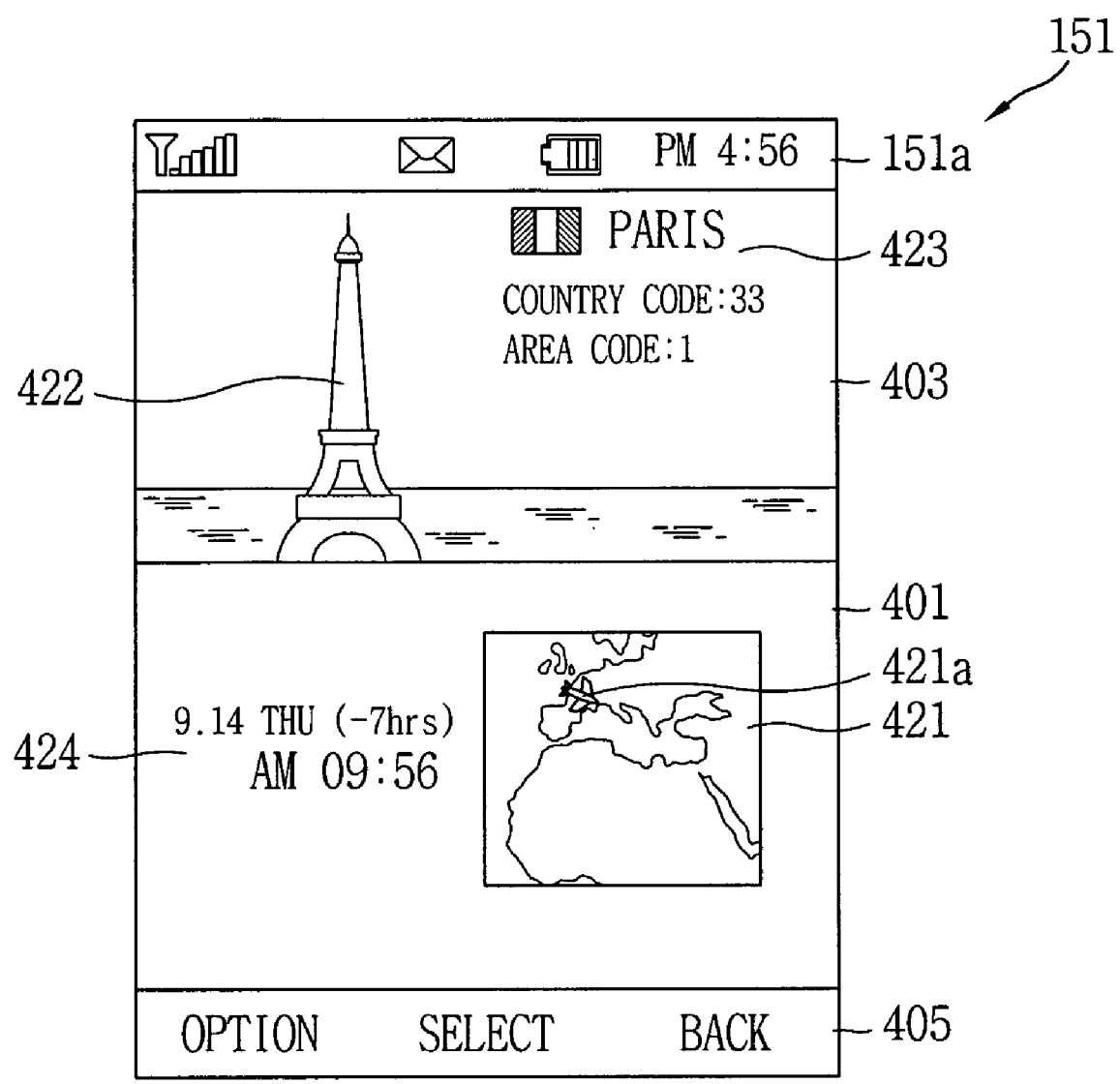
FIG. 10 is a view showing another example of a screen image of the mobile terminal according to the embodiment of the present invention.

FIGS. 9 and 10 are views showing another example of a screen configuration of the mobile terminal according to an embodiment of the present invention.

The display unit 151 may allow the user to select a desired particular area and display time information and representative information of the area. In the following description, a case wherein information such as a country code and/or an area code is provided as representative information of the selected area will be taken as an example.

As shown in FIG. 9, the first display region 401 may provide a map image 421 for selecting a particular area, and information 424 of a country code and an area code of the selected particular area may be provided in conjunction with the map image 421. Meanwhile, as in the example described above, time information of the selected corresponding area may be provided at the second display area 403. The representative information of the selected corresponding area may be provided at the second display region 403 as described above.

When the information about the corresponding area is provided at the second display region 403, the information about the country code and/or the area code of the selected area as mentioned above may be also provided together. In addition, it may be configured such that the user may perform call communication with a desired party by using the country code and the area code of the particular area. For example, with the country code and/or area code of the selected area provided at the first display region 401, when the mobile terminal is changed to a call mode, the country code and the area code may be automatically set and the user may input only need to enter the other remaining phone number digits of the party to be called to perform call communication.

The configurations of the first and second display regions 401 and 403 may be the same as that of the former example as described above, so its detailed description will be omitted.

In a modification of the example as shown in FIG. 9, as shown in FIG. 10, the map image 421 for selecting a particular area may be provided at the first display region 401 and time information of the selected area may be provided together with the map image 421. A representative image of the selected area may be displayed at the second display region 403. In this case, a country code and an area code of the selected area may be provided together.

The user may easily perform call communication with a desired party by the displayed country code and area code. For example, with the country code and the area code of the particular area displayed, when the user presses a call key, the history or log record of calls (e.g., origination/reception list) which have lo been made in association with the area may be displayed and the user can select a desired phone number (or other contact number) based on the call history.

Figure 11:
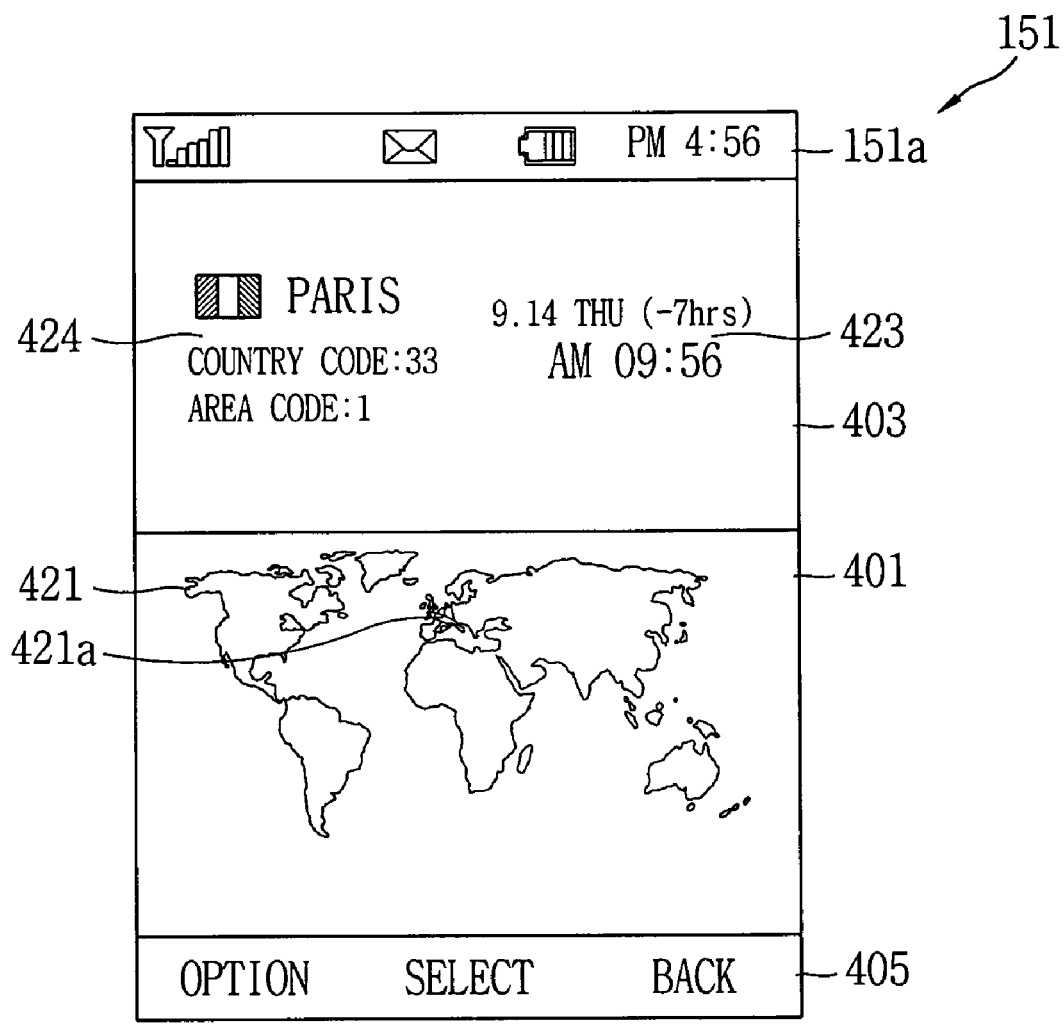
FIG. 11 is a view showing another example of a screen image of the mobile terminal according to the embodiment of the present invention.

FIG. 11 is a view showing another example of a screen configuration of the mobile terminal according to an embodiment of the present invention.

The display unit 151 may allow the user to select a particular area and display time information of the selected area and supplementary information of a city. Here, the supplementary information may be a country code or an area code of the particular area.

In this case, the display unit 151 may include the first display region 401 for selecting a particular area to check the time information and the second display region 403 that provides the time information and supplementary information of the particular area selected by the first display region 401.

The configuration of the first display region 401 may be the same as that of the former example, so its description will be omitted.

The time information of the particular area provided at the second display region 403 may have the same configuration as that shown in FIG. 6, and the supplementary information provided at the second display region 403 may have the same configuration as that of the example as shown in FIGS. 9 and 10. Thus, their detailed descriptions will be omitted.

Figure 12:
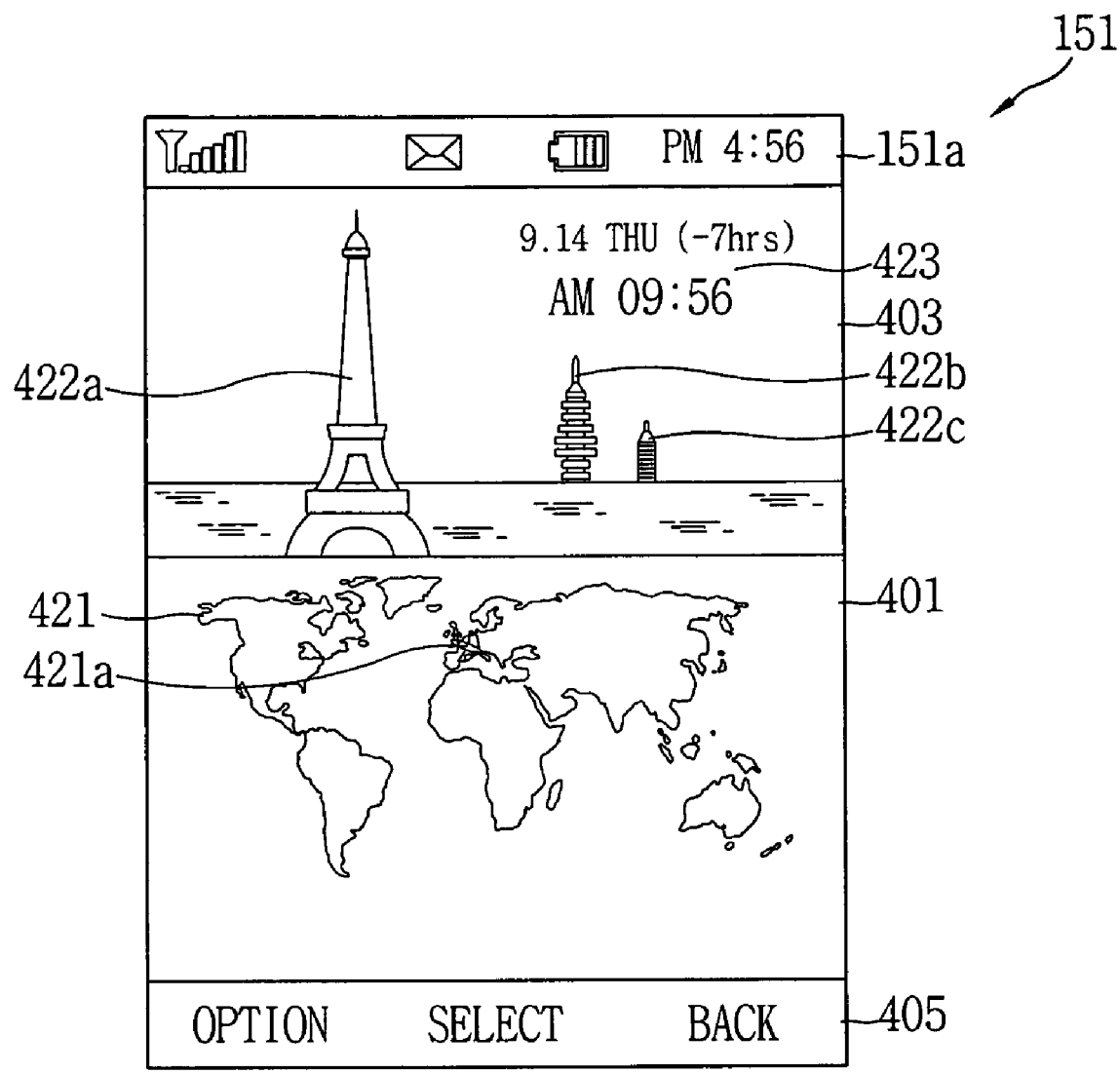
FIG. 12 is a view showing another example of a screen image of the mobile terminal according to the embodiment of the present invention.

FIG. 12 is a view showing another example of a screen configuration of the mobile terminal according to an embodiment of the present invention.

The display unit 151 may be used to select a particular area and display time information and a representative image 422 of the selected area.

Here, the representative image 422 of the selected area may be provided according to the location order of the selected area or according to the order to be selected. Namely, as the representative image 422, a currently selected representative image 422a and representative images 422b and 422c that have been selected before or after the currently selected image 422a may be provided together in a visually distinguishable manner. In addition, the previously selected or subsequently selected representative images 422b and 422c may be sequentially differentiated in size and/or contrast (or color). The information about the particular area to be selected may be predicted based on the sequentially displayed representative images on the second display region 403, or a previously selected particular area may be checked.

In the above example, although not shown, the first display region 401 may provide a list of selectable area names as in the configuration of the examples shown in FIGS. 7 and 8, or a third display region 401' providing a list of the area names may be shown. As in the configuration of the example shown in FIG. 9, the first display region 401 may provide different information about the selected area, such as the information of the country code and/or area code of the corresponding area.

Figure 13A:
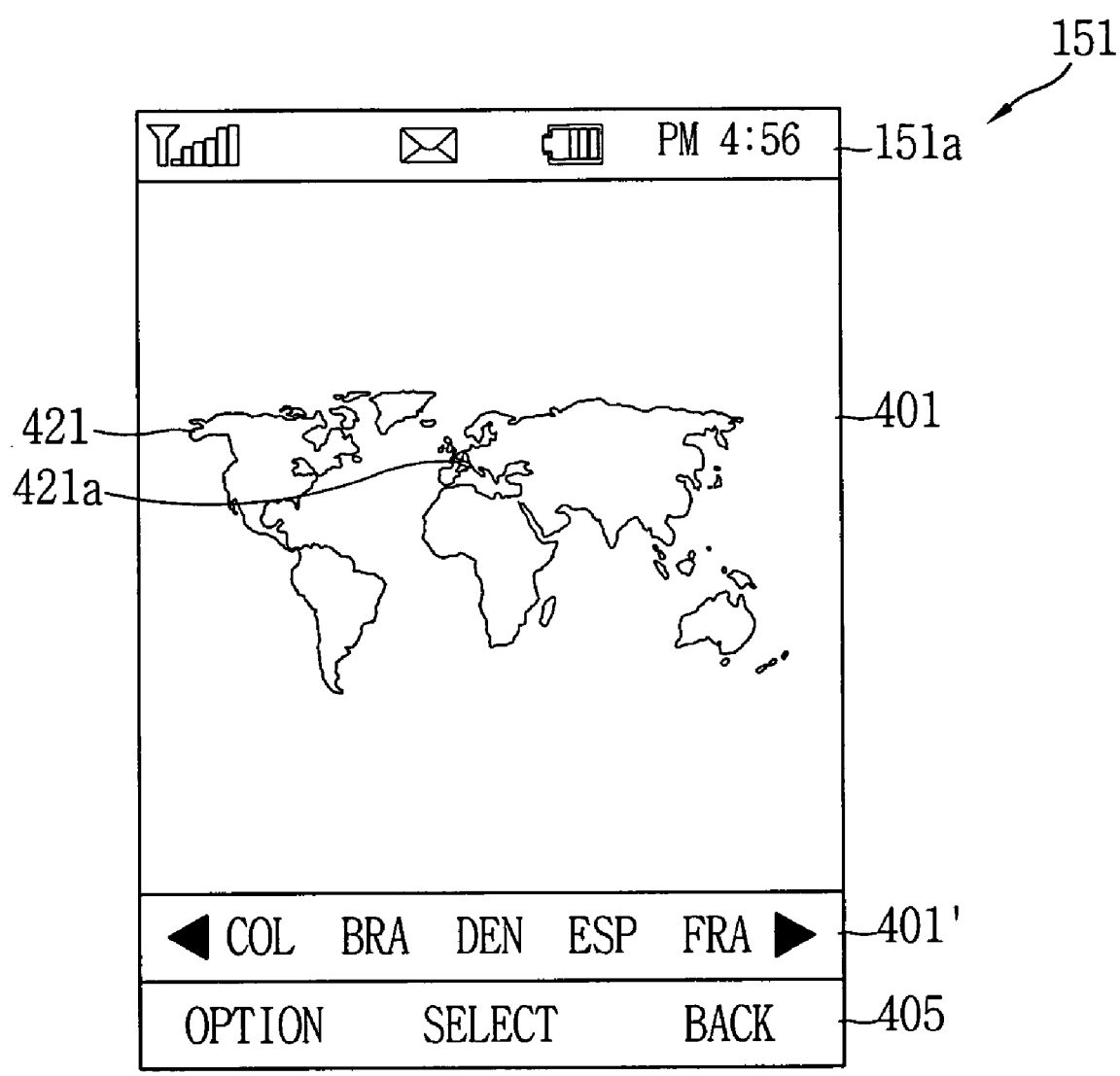
FIGS. 13A and 13B are views showing another examples of a screen image of the mobile terminal according to the embodiment of the present invention.
Figure 13B:
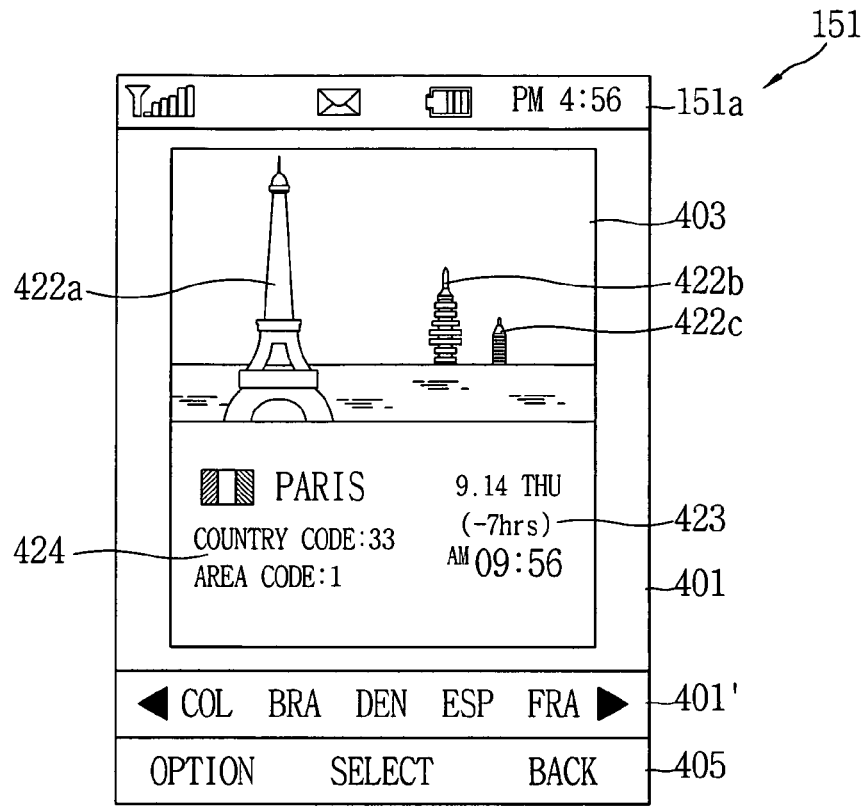

FIGS. 13A and 13B are views showing other examples of a screen configuration of the mobile terminal according to an embodiment of the present invention.

The display unit 151 may be configured to provide the first display region 401 for selecting a particular area to check time information and the second display region 403 on or over the first display region 401 to indicate time information of the selected area. The second display region 403 may be shown in a pop-up manner.

The first display region 401 may provide the map image 421 to allow the user to conveniently select a desired particular area. Unlike the above-described examples, the map image 421 provided at the first display region 401 may have the same size as or a size substantially corresponding to the display unit 151, so that a location of the selected particular area can be easily viewed and selected.

Although not shown, a list of area names may be provided at the first display region 401 or the third display region 401' displaying a list of area names may be additionally shown. As for other configurations of the first display region 401, the features of the respective examples may be selectively applied to the first display region 401, so its detailed description will be omitted.

The second display region 403 shown on or over the first display region 401 may provide time information of the selected area together with the representative image of the selected area. As the representative image, in this example, landmark and tourist attractions are displayed, but other graphics or images, such as animals and plants symbolizing the selected area or traditional costumes may be displayed (422a, 422b, 422c).

It should be noted that as the user scrolls through different cities (or areas) via the menu list, the corresponding graphics displayed on the screen may have animated or moving effects, as if the user flies through the air from one city to the next.

Figure 14:
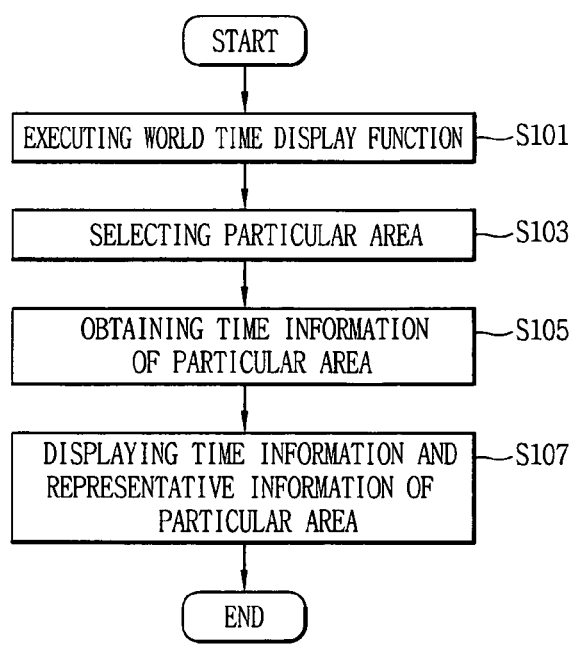
FIG. 14 is a flow chart illustrating the process of a world time display method of the mobile terminal according to the embodiment of the present invention.
Figure 15:
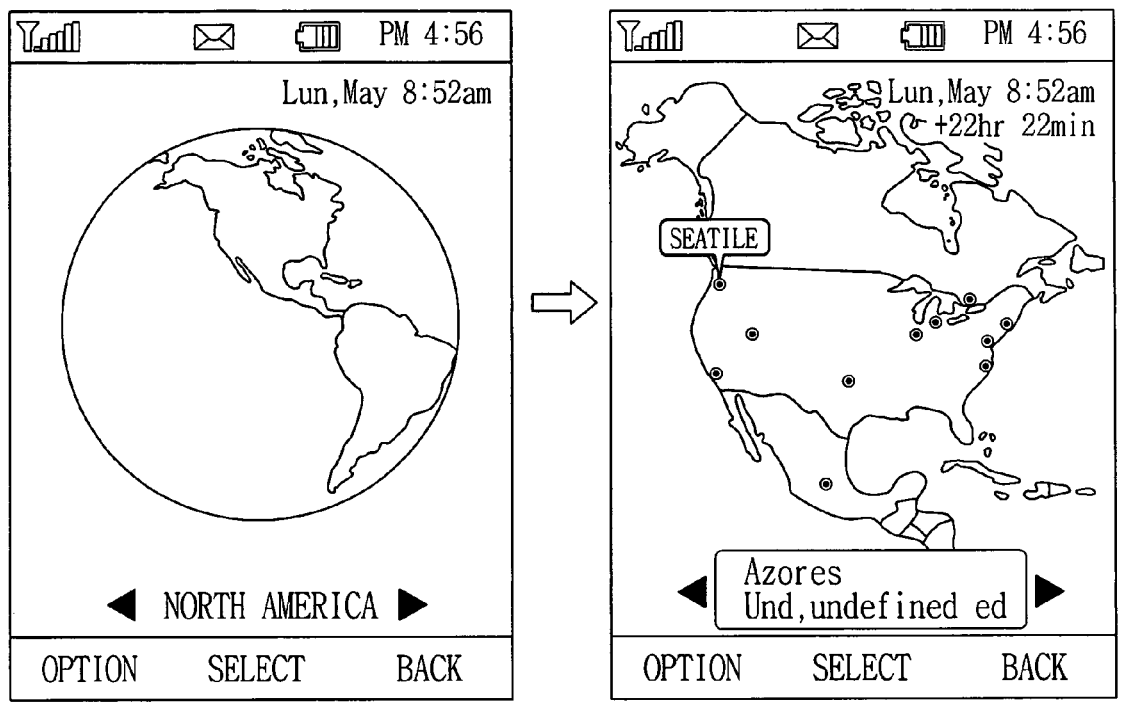
FIG. 15 is a view showing screen images for selecting an area in the mobile terminal according to the embodiment of the present invention.

FIG. 14 is a flow chart illustrating an exemplary process of a world time display method of the mobile terminal according to an embodiment of the present invention, and FIG. 15 is a view showing exemplary world time display screen images of the mobile terminal of FIG. 14.

When the time at a particular area needs to be viewed, the user may execute a world time display function by navigating through the menus of the mobile terminal 100. Then, the controller 180 provides appropriate control to display the world time display function screen image on the display unit 151 (S101).

The controller 180 may select a particular area whose time is desired to be viewed from the world time display function screen image according to a user input from the user input unit 130 (S103). The particular area may be selected in various manners. First, as in the above examples, when the map image 421 is provided, the cursor 421a on the map image 421 may be moved to a desired point to select the particular area.

In addition, when the list of area names is provided, the cursor may be moved over the list of area names, or in a state that the cursor is fixed, the list of area names itself may be shifted to allow selection of the desired particular area.

Alternatively, a text input window allowing the user to directly input a search word may be provided to allow the user to search for an area corresponding to a search word inputted into the text input window and select one of search results. For example, if 'Eiffel Tower' is inputted as a search word, the controller 180 may search and display the geographical location(s) corresponding to 'Eiffel Tower' and the user may select a desired city or country from the search results.

In addition, when the user directly inputs a desired area name, the controller 180 may provide control such that time information and representative information with respect to the corresponding area is displayed.

With reference to FIG. 15, a globe image may be displayed on the display unit 151 and a desired one of the continents displayed on the globe image according to manipulation of a direction key of the user input unit 130. Here, the globe image may be a three-dimensional image which may be moved or rotated according to the manipulation of the direction key (or other means) of the user input unit 130. At this time, time information of the area where the user is currently located and the name of a continent may be display together. When the continent is selected, the controller 180 may display an image of the corresponding continent on the display unit 151. Thereafter, the user may select a city positioned within the selected continent according to an input via the user input unit 130, and detailed information about the selected city may be displayed on the display unit 151. The detailed information may include the name of the city, information about a time difference from the area where the user is currently located, and time information of the area where the user is currently located may be displayed together with the detailed information. When a city is selected, the cursor may be moved to a desired city according to manipulation of the user input unit 130, or one city name on the displayed list may be selected. When the list of the city names itself is moved (shifted), it may be implemented such that the city names displayed on the screen change sequentially and the cursor and/or an indicator appears to be moved to a position corresponding to the changed city names.

When the particular area whose time is desired to be viewed is selected, the controller 180 obtains time information of the selected area (S105). The time information may be obtained by using the wireless communication unit 110 or through calculations performed by the terminal itself. When the time information of the selected area is obtained, information about a sunrise/sunset time of the selected area can be obtained together. Thus, if the time of the currently selected area is after sunrise but before sunset, it is determined as day time, and if the time of the currently selected area is after sunset but before sunrise, it is determined as night time.

Namely, assuming that the sunrise time and the sunset time of the selected area is 5:00 am and 7:00 pm, respectively, the controller 180 determines that the current time of the selected area is 2:00 pm, it is determined to be daytime, and if the current time of the selected area is 2:00 am, the controller 180 determines that it is currently night time.

Figure 16:
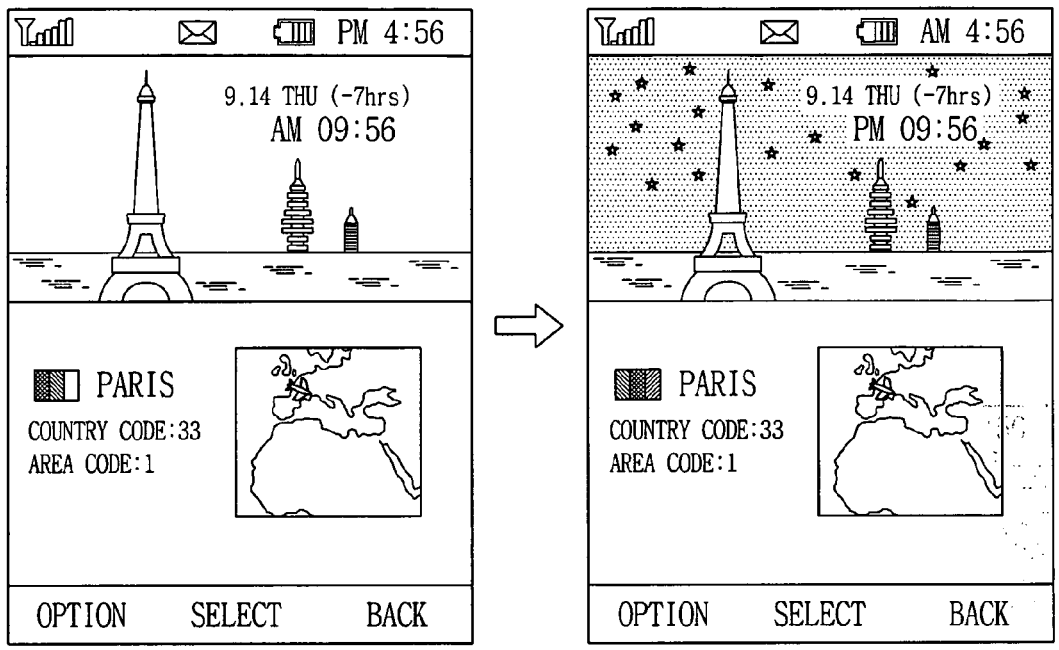
FIG. 16 is a view showing one example of a screen image showing a world time in the mobile terminal according to the embodiment of the present invention.

Accordingly, time zone information (day time/night time) can be displayed together with the time information of the selected area. In this case, as shown in FIG. 16, if it is day time, the time zone information may be outputted as a bright background image, and if it is night time, the time zone information may be outputted as a dark background image.

After the time information of the selected area is obtained, the controller 180 provides control to display the representative information of the selected area and a map image indicating a geographical location of the selected area (S107). The representative information indicates the characteristics of the selected area, including a symbolic object, a building, animals and plants, traditional costumes, country information, popular tourist attractions, a language, weather conditions, and so on.

Figure 17:
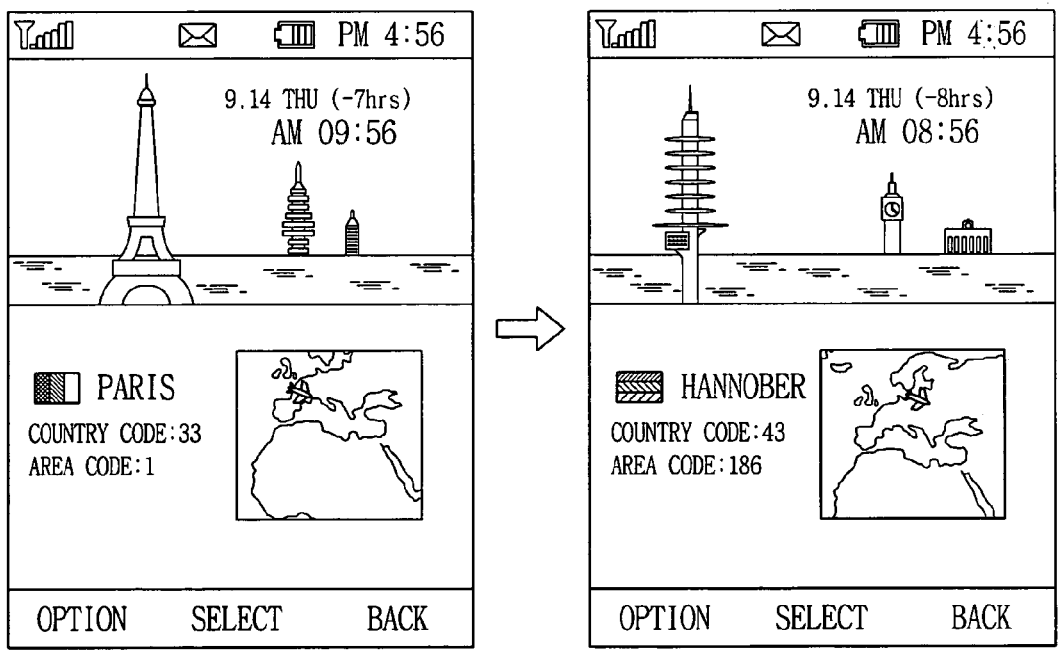
FIG. 17 is a view showing another example of a screen image showing a world time in the mobile terminal according to the embodiment of the present invention.

For example, if the selected area is 'Paris', as shown in FIG. 17, an image of an edifice representing 'Paris' may be magnified to be displayed on the screen, and if the selected city changes to 'Hanover', the controller 180 makes the edifice of 'Paris' disappear and displays a magnified image of a building representing 'Hanover'. In this case, as shown in FIG. 17, the information, such as location information of the selected city, a national flag, a country code, an area code, a time difference from a current location, date, etc., may be also displayed, and in addition, weather information may be also displayed.

Figure 18:
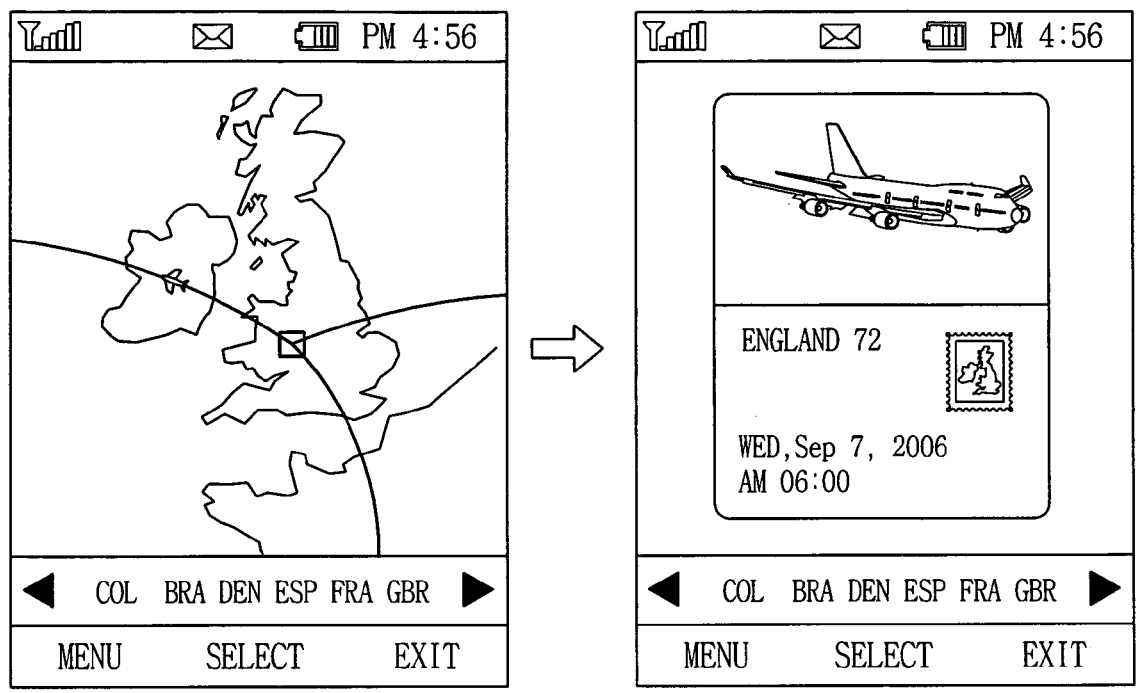
FIG. 18 is a view showing another example of a screen image showing a world time in the mobile terminal according to the embodiment of the present invention.

FIG. 18 is a view showing another example of a screen image showing a world time function in the mobile terminal according to an embodiment of the present invention.

Here, the method for displaying a world time function on the screen of the mobile terminal 100 is similar to that of the above-described examples, so only the different features will be described to avoid repetition.

With reference to FIG. 18, an indication point may be moved to indicate a geographical location on the map image according to user manipulations via the user input unit 130, and a background image corresponding to a time zone of a particular area indicated by the indication point may be outputted on the screen.

When time information of the area indicated by the indication point is desired, a menu 'select' in FIG. 18 may be selected by the user. Then, the mobile terminal 100 can display representative information and time information about the corresponding area as a pop-up image.

Figure 19:
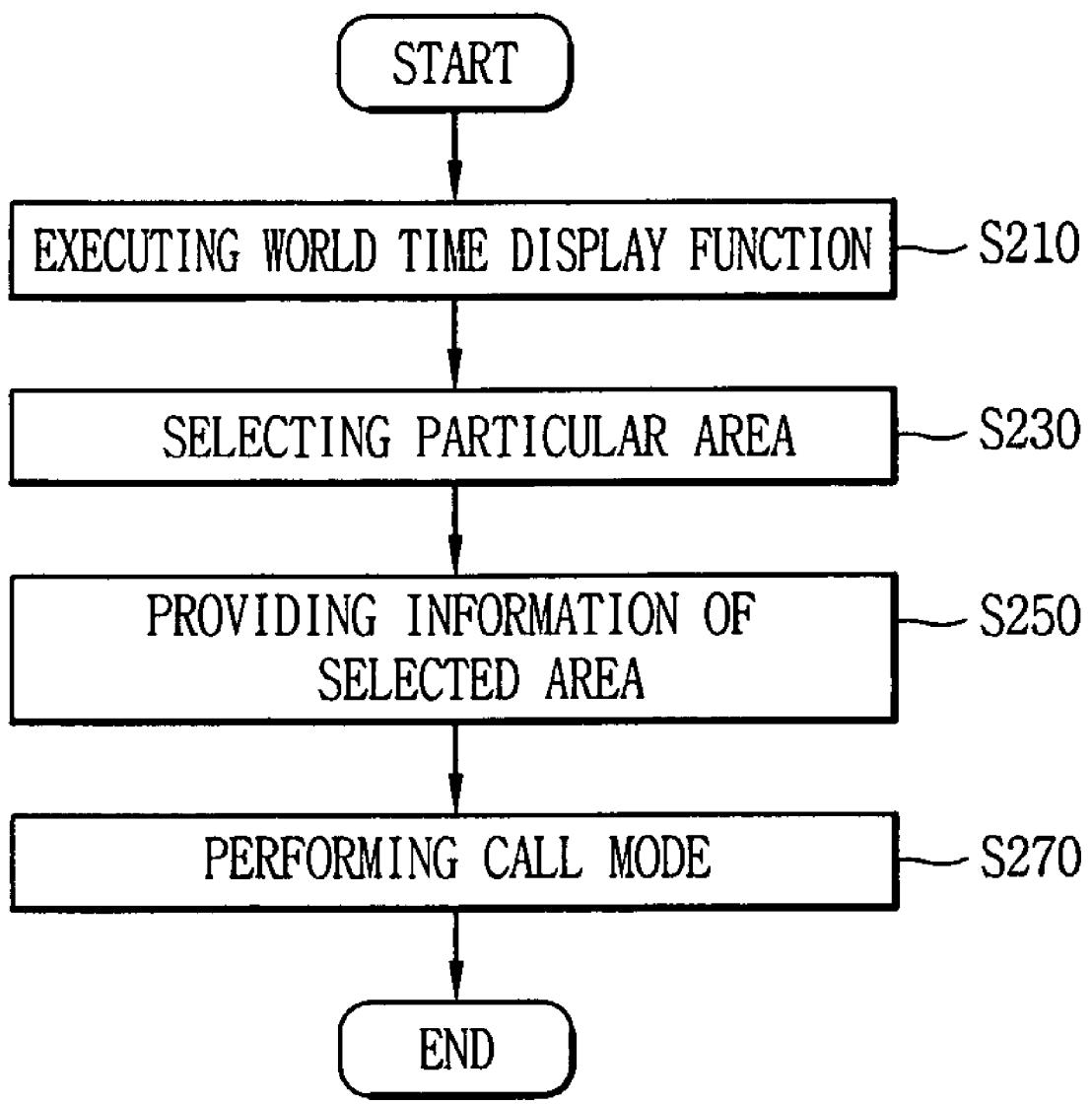
FIG. 19 is a flow chart illustrating the process of a world time display method of the mobile terminal according to another embodiment of the present invention.

FIG. 19 is a flow chart illustrating an exemplary process of a world time display method of the mobile terminal according to another embodiment of the present invention.

The controller 180 may execute the world time display function for displaying a world time on the display unit 151 according to an input signal generated by the user input unit 130 (S210).

When the world time display function is executed, the controller 180 receives a selected particular area whose time is desired to be viewed (S230). In this case, the particular area can be selected in various manners.

First, a list of area names may be provided so that one of them can be selected. Alternatively, a search word (e.g., the name of an area or a country) may be inputted to select one of searched areas. In addition, the map image 421 may be provided and the indicating point may be moved by the user to a desired position on the map image to select an area whose time is required to be checked.

In the present example, after the particular area is selected by the user is taken as an example, when the location of the terminal changes and roaming is automatically performed, the current location of the mobile terminal 100 may be selected via the wireless communication unit 110.

When the particular area is selected, the controller performs to display the time information of the selected area on the display unit 151 (S250). In this case, the controller 180 may perform control to output representative information of the selected area together with the time information.

The time information may include the date, the time difference from a current location, time zone (day/night) information, etc. The representative information may include buildings or the like that may represent a selected area, animals and plants, traditional costumes, popular tourist attractions, weather conditions, country language, a country code, an area code, etc. The representative information to be displayed on the display unit 151 may be selected by the user, and representative information may be added or deleted. In addition, when each information is provided on the display unit 151, the brightness of a background image may be adjusted to display each information according to the current time of the selected area. The controller 180 may additionally display a background image indicating weather conditions or weather information of the selected area.

When a call connection is attempted by the user with the time information and representative information of the selected area being displayed, the controller 180 may receive the other remaining digits of the phone number of the desired party for call communication by using the country code and area code of the selected area, to perform a call. For example, when the mobile terminal changes to a call mode in the state that the time information and the representative information of the particular area are displayed, the controller 180 provides a state that a country code and/or area code of the selected area have been previously inputted. Accordingly, the user may simply receive only the phone number of another party and perform call communication.

When a call key is manipulated by the user in the state that the time information and the representative information of the selected area are displayed, the controller 180 provides a call history (call records) with respect to the corresponding area based on the country code and the area code of the selected area. Then, the user may select a desired party or phone number from the call history and perform call communication. If there is no party desired for call communication in the call history, only the country code and the area code of the selected area can be used and the other remaining digits of the phone number of the desired party for call communication are received to perform a call operation.

In the embodiments of the present invention, the above-described method can be implemented as software codes that can be read by a computer in a program-recorded medium. The computer-readable medium includes various types of recording devices in which data read by a computer system is stored. The computer-readable medium may include a ROM, a RAM, a CD-ROM, a magnetic tape, a floppy disk, an optical data storage device, and the like. The computer-readable medium also includes implementations in the form of carrier waves or signals (e.g., transmission via the Internet).

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A method for displaying world time information in a mobile terminal, the method comprising:
   executing a world time display function according to the occurrence of an event; and
   displaying, on a display unit of the mobile terminal, time information and representative information of an area selected according to the executed world time display function,
   wherein the time information includes texts, and the representative information corresponds to at least one image that represents the selected area,
   wherein the at least one image of the selected area includes at least one of animals and plants, country information, information about popular tourist attractions, weather conditions, seasons, a used language, a country code and an area code, and
   wherein the display unit includes a first display region and a second display region, the first display region that displays one or more of a map image, a list of area names and a search word input window to allow user selection of a particular area, and the second display region that displays a combination of the texts and the at least one image.

2. The method of claim 1, wherein the event is based on a user menu selection.

3. The method of claim 1, wherein the event is a signal generated by manipulating a certain key to which the world time display function has been allocated.

4. The method of claim 1, wherein the event is based on automatic roaming or alarm functions.

5. The method of claim 1, wherein the time information comprises a time zone, date, and information about a time difference between a current location and the selected area.

6. The method of claim 1, wherein the displaying of the time information and the representative information comprises:
   receiving a user selection of a particular area when the world time display function is executed;
   obtaining the time information and the representative information of the selected area; and
   displaying the obtained time information and the representative information.

7. The method of claim 1, further comprising:
   changing to a call mode in the state that the time information and the representative information of the selected area are displayed.

8. The method of claim 7, wherein when the mobile terminal changes to the call mode, one or more of a country code and an area code of the selected area are automatically added as a prefix to digits inputted by a user.

9. The method of claim 7, wherein when the mobile terminal changes to the call mode, origination/reception history associated with the selected area is searched and displayed.

10. A mobile terminal comprising:
   a controller that executes a world time display function according to the occurrence of an event; and
   a display unit that displays time information and representative information of the selected area according to the executed world time display function under the control of the controller,
   wherein the time information includes texts, and the representative information corresponds to at least one image that represents the selected area,
   wherein the at least one image of the selected area includes at least one of animals and plants, country information, information about popular tourist attractions, weather conditions, seasons, a used language, a country code and an area code, and
   wherein the display unit comprises:
   a first display region that displays one or more of a map image, a list of area names and a search word input window to allow user selection of a particular area; and
   a second display region that displays a combination of the texts and the at least one image.

11. The mobile terminal of claim 10, further comprising:
   a wireless communication unit that obtains a current location of the mobile terminal, the time information and the representative information.

12. The mobile terminal of claim 10, wherein the controller receives a selected area according to an external input or an internal input.

13. The mobile terminal of claim 12, wherein the internal input is based on automatic roaming or alarm functions.

14. The mobile terminal of claim 10, wherein when the mobile terminal changes to a call mode in the state that the time information and the representative information of the selected area are displayed, the controller automatically adds as a prefix to digits inputted by a user one or more of a country code and an area code of the selected area.

15. The mobile terminal of claim 10, wherein when the mobile terminal changes to the call mode in the state that the time information and the representative information of the selected area are displayed, the controller searches and displays an origination/reception history associated with the selected area.

16. The mobile terminal of claim 10, wherein the time information comprises a time zone, date, and information about a time difference between a current location and the selected area.

17. The mobile terminal of claim 10, wherein one of the first and second display regions is shown in an overlay manner.

18. The method of claim 1, wherein the event occurrence effectuates both the execution of the world time display function and a search of an origin or destination information associated with the information displayed at the first or second display regions of the display unit.

19. The method of claim 18, wherein the search of the origin or destination information searches stored user call records for information about one or more past call recipients.

20. The method of claim 19, wherein the information about one or more past call recipients is displayed as a user selection at the first or second display regions as a result of the search.

21. The mobile terminal of claim 10, wherein the event occurrence effectuates both the execution of the world time display function and a search of an origin or destination information associated with the information displayed at the first or second display regions of the display unit.

22. The mobile terminal of claim 21, wherein the search of the origin or destination information searches stored user call records for information about one or more past call recipients.

23. The mobile terminal of claim 22, wherein the information about one or more past call recipients is displayed as a user selection at the first or second display regions as a result of the search.

* * * * *

UNITED STATES PATENT AND TRADEMARK OFFICE
CERTIFICATE OF CORRECTION

PATENT NO.       : 8,280,413 B2
APPLICATION NO.  : 12/026442
DATED            : October 2, 2012
INVENTOR(S)      : Mee-Yeon Choi et al.

It is certified that error appears in the above-identified patent and that said Letters Patent is hereby corrected as shown below:

ON THE TITLE PAGE:

At item (75), Inventors, correct the identity of the second-named inventor from

"Jee-Yong Chun, Seoul (KR)" to --Jee-Young Chun, Seoul (KR)--.

Signed and Sealed this
Twenty-second Day of January, 2013

David J. Kappos
*Director of the United States Patent and Trademark Office*